United States Patent
Young et al.

(10) Patent No.: US 9,395,190 B1
(45) Date of Patent: Jul. 19, 2016

(54) CROWD SOURCED MAPPING WITH ROBUST STRUCTURAL FEATURES

(71) Applicant: TRX Systems, Inc., Greenbelt, MD (US)

(72) Inventors: Travis Young, Rockville, MD (US); Kamiar Kordari, McLean, VA (US); Benjamin Funk, Hanover, MD (US); Carole Teolis, Glenn Dale, MD (US)

(73) Assignee: TRX Systems, Inc., Greenbelt, MD (US)

( * ) Notice: Subject to any disclaimer, the term of this patent is extended or adjusted under 35 U.S.C. 154(b) by 0 days.

(21) Appl. No.: 14/714,212

(22) Filed: May 15, 2015

Related U.S. Application Data

(60) Provisional application No. 62/100,458, filed on Jan. 6, 2015.

(51) Int. Cl.
  G01C 21/10 (2006.01)
  G01C 21/20 (2006.01)
  G01C 21/16 (2006.01)

(52) U.S. Cl.
  CPC ............ *G01C 21/206* (2013.01); *G01C 21/165* (2013.01)

(58) Field of Classification Search
  CPC .................................. G08B 1/08; B08B 13/14
  USPC ............. 701/409, 411, 434, 446; 340/539.13, 340/539.22
  See application file for complete search history.

(56) References Cited

U.S. PATENT DOCUMENTS

| | | |
|---|---|---|
| 5,552,772 A | 9/1996 | Janky et al. |
| 5,583,776 A | 12/1996 | Levi et al. |
| 5,645,077 A | 7/1997 | Foxlin |
| 5,652,570 A | 7/1997 | Lepkofker |
| 5,742,509 A | 4/1998 | Goldberg et al. |
| 5,774,385 A | 6/1998 | Bristol |
| 5,899,963 A | 5/1999 | Hutchings |
| 5,956,660 A | 9/1999 | Neumann |
| 5,977,913 A | 11/1999 | Christ |
| 5,990,793 A | 11/1999 | Bieback |
| 6,031,454 A | 2/2000 | Lovejoy et al. |
| 6,061,021 A | 5/2000 | Zibell |
| 6,072,396 A | 6/2000 | Gaukel |

(Continued)

FOREIGN PATENT DOCUMENTS

| | | |
|---|---|---|
| EP | 2179600 A1 | 4/2010 |
| WO | WO 02/056274 A1 | 7/2002 |

(Continued)

OTHER PUBLICATIONS

U.S. Appl. No. 14/262,618, filed Apr. 25, 2014, Funk et al.

(Continued)

*Primary Examiner* — Luke Huynh
(74) *Attorney, Agent, or Firm* — Baker & Hostetler LLP

(57) ABSTRACT

A location and mapping service is described that creates a global database of indoor navigation maps through crowd-sourcing and data fusion technologies. The navigation maps consist of a database of geo-referenced, uniquely described features in the multi-dimensional sensor space (e.g., including structural, RF, magnetic, image, acoustic, or other data) that are collected automatically as a tracked mobile device is moved through a building (e.g. a person with a mobile phone or a robot). The feature information can be used to create building models as one or more tracked devices traverse a building.

20 Claims, 16 Drawing Sheets

(56) References Cited

U.S. PATENT DOCUMENTS

| | | |
|---|---|---|
| 6,100,806 A | 8/2000 | Gaukel |
| 6,122,960 A | 9/2000 | Hutchings et al. |
| 6,181,253 B1 | 1/2001 | Eschenbach et al. |
| 6,240,367 B1 | 5/2001 | Lin |
| 6,362,778 B2 | 3/2002 | Neher |
| 6,366,855 B1 | 4/2002 | Reilly et al. |
| 6,415,223 B1 | 7/2002 | Lin et al. |
| 6,474,159 B1 | 11/2002 | Foxlin et al. |
| 6,496,779 B1 | 12/2002 | Hwang |
| 6,504,483 B1 | 1/2003 | Richards et al. |
| 6,512,455 B2 | 1/2003 | Finn et al. |
| 6,522,266 B1 | 2/2003 | Soehren et al. |
| 6,622,090 B2 | 9/2003 | Lin |
| 6,631,323 B2 | 10/2003 | Tucker et al. |
| 6,658,354 B2 | 12/2003 | Lin |
| 6,681,629 B2 | 1/2004 | Foxlin et al. |
| 6,721,769 B1 | 4/2004 | Rappaport et al. |
| 6,792,353 B2 | 9/2004 | Lin |
| 6,813,582 B2 | 11/2004 | Levi et al. |
| 6,826,477 B2 | 11/2004 | Ladetto et al. |
| 6,833,811 B2 | 12/2004 | Zeitfuss et al. |
| 6,847,892 B2 | 1/2005 | Zhou et al. |
| 6,850,844 B1 | 2/2005 | Walters et al. |
| 6,898,559 B2 | 5/2005 | Saitta |
| 6,900,732 B2 | 5/2005 | Richards |
| 6,922,632 B2 | 7/2005 | Foxlin |
| 6,944,542 B1 | 9/2005 | Eschenbach |
| 6,995,665 B2 | 2/2006 | Appelt et al. |
| 7,000,469 B2 | 2/2006 | Foxlin et al. |
| 7,015,831 B2 | 3/2006 | Karlsson et al. |
| 7,034,678 B2 | 4/2006 | Burkley et al. |
| 7,091,851 B2 | 8/2006 | Mason et al. |
| 7,091,852 B2 | 8/2006 | Mason et al. |
| 7,103,471 B2 | 9/2006 | Levi et al. |
| 7,106,189 B2 | 9/2006 | Burneske et al. |
| 7,135,992 B2 | 11/2006 | Karlsson et al. |
| 7,143,130 B2 | 11/2006 | Lin |
| 7,145,478 B2 | 12/2006 | Goncalves et al. |
| 7,161,504 B2 | 1/2007 | Linn |
| 7,162,338 B2 | 1/2007 | Goncalves et al. |
| 7,177,737 B2 | 2/2007 | Karlsson et al. |
| 7,199,754 B2 | 4/2007 | Krumm et al. |
| 7,203,497 B2 | 4/2007 | Belcea |
| 7,236,880 B2 | 6/2007 | Fager et al. |
| 7,239,277 B2 | 7/2007 | Fullerton et al. |
| 7,239,953 B2 | 7/2007 | Braunberger et al. |
| 7,245,215 B2 | 7/2007 | Gollu et al. |
| 7,245,216 B2 | 7/2007 | Burkley et al. |
| 7,250,907 B2 | 7/2007 | Krumm et al. |
| 7,259,656 B1 | 8/2007 | Wright |
| 7,263,379 B1 | 8/2007 | Parkulo et al. |
| 7,272,467 B2 | 9/2007 | Goncalves et al. |
| 7,295,119 B2 | 11/2007 | Rappaport et al. |
| 7,301,648 B2 | 11/2007 | Foxlin |
| 7,302,359 B2 | 11/2007 | McKitterick |
| 7,304,571 B2 | 12/2007 | Halsey et al. |
| 7,305,303 B2 | 12/2007 | Soehren et al. |
| 7,377,835 B2 | 5/2008 | Parkulo et al. |
| 7,379,015 B2 | 5/2008 | Workman |
| 7,389,207 B2 | 6/2008 | Saitta |
| 7,400,246 B2 | 7/2008 | Breeding |
| 7,403,853 B1 | 7/2008 | Janky et al. |
| 7,405,658 B2 | 7/2008 | Richards |
| 7,421,340 B2 | 9/2008 | Ladetto et al. |
| 7,423,580 B2 | 9/2008 | Markhovsky et al. |
| 7,516,039 B2 | 4/2009 | McKitterick |
| 7,538,715 B2 | 5/2009 | Langford et al. |
| 7,573,403 B2 | 8/2009 | Goncalves et al. |
| 7,587,274 B2 | 9/2009 | Kaldewey et al. |
| 7,646,336 B2 | 1/2010 | Tan et al. |
| 7,672,781 B2 | 3/2010 | Churchill et al. |
| 7,679,532 B2 | 3/2010 | Karlsson et al. |
| 7,689,321 B2 | 3/2010 | Karlsson |
| 7,701,347 B2 | 4/2010 | Richards |
| 7,725,253 B2 | 5/2010 | Foxlin |
| 7,747,409 B2 | 6/2010 | Ladetto et al. |
| 8,284,100 B2 | 10/2012 | Vartanian et al. |
| 8,296,058 B2 | 10/2012 | Koskan et al. |
| 8,423,042 B2 | 4/2013 | Markhovsky et al. |
| 8,521,418 B2 | 8/2013 | Ma et al. |
| 8,686,731 B2 | 4/2014 | Zeller et al. |
| 8,688,375 B2 | 4/2014 | Funk et al. |
| 8,712,686 B2 | 4/2014 | Bandyopadhyay et al. |
| 8,718,935 B2 | 5/2014 | Miller et al. |
| 8,731,817 B2 | 5/2014 | Ballew et al. |
| 8,751,151 B2 | 6/2014 | Funk et al. |
| 2002/0010694 A1 | 1/2002 | Navab et al. |
| 2002/0193091 A1 | 12/2002 | Zmarthie |
| 2003/0045998 A1 | 3/2003 | Medl |
| 2003/0135324 A1 | 7/2003 | Navab |
| 2003/0158635 A1 | 8/2003 | Pillar et al. |
| 2003/0158664 A1 | 8/2003 | Swope et al. |
| 2003/0191582 A1 | 10/2003 | Terada |
| 2003/0214410 A1 | 11/2003 | Johnson et al. |
| 2003/0216865 A1 | 11/2003 | Riewe et al. |
| 2004/0021569 A1* | 2/2004 | Lepkofker et al. .......... 340/568.1 |
| 2004/0066316 A1 | 4/2004 | Ogawa |
| 2005/0033515 A1 | 2/2005 | Bozzone |
| 2005/0060088 A1 | 3/2005 | Helal et al. |
| 2005/0234679 A1 | 10/2005 | Karlsson |
| 2005/0242947 A1* | 11/2005 | Burneske et al. ........ 340/539.13 |
| 2005/0250440 A1 | 11/2005 | Zhou et al. |
| 2006/0002590 A1 | 1/2006 | Borak |
| 2006/0023681 A1 | 2/2006 | A'Rafat |
| 2006/0125644 A1 | 6/2006 | Sharp |
| 2006/0287824 A1 | 12/2006 | Lin |
| 2007/0001904 A1 | 1/2007 | Mendelson |
| 2007/0032748 A1 | 2/2007 | McNeil et al. |
| 2007/0050129 A1 | 3/2007 | Salmre |
| 2007/0093962 A1 | 4/2007 | Swope et al. |
| 2007/0139200 A1 | 6/2007 | Yushkov et al. |
| 2007/0168126 A1 | 7/2007 | Wence et al. |
| 2007/0168127 A1 | 7/2007 | Zaruba et al. |
| 2007/0271011 A1 | 11/2007 | Lee et al. |
| 2007/0271037 A1 | 11/2007 | Overstreet et al. |
| 2007/0282565 A1 | 12/2007 | Bye et al. |
| 2008/0004796 A1 | 1/2008 | Schott et al. |
| 2008/0033645 A1 | 2/2008 | Levinson et al. |
| 2008/0036594 A1 | 2/2008 | Kates |
| 2008/0077326 A1 | 3/2008 | Funk et al. |
| 2008/0186161 A1 | 8/2008 | Fussner et al. |
| 2009/0019402 A1 | 1/2009 | Ke et al. |
| 2009/0043504 A1 | 2/2009 | Bandyopadhyay et al. |
| 2009/0060085 A1 | 3/2009 | Nadler et al. |
| 2009/0216438 A1 | 8/2009 | Shafer |
| 2009/0248304 A1 | 10/2009 | Roumeliotis et al. |
| 2009/0262974 A1* | 10/2009 | Lithopoulos .................. 382/100 |
| 2009/0321094 A1 | 12/2009 | Thomas |
| 2011/0080848 A1 | 4/2011 | Khorashadi et al. |
| 2011/0082643 A1 | 4/2011 | Huseth et al. |
| 2011/0212717 A1 | 9/2011 | Rhoads et al. |
| 2011/0282622 A1 | 11/2011 | Canter |
| 2012/0072052 A1 | 3/2012 | Powers et al. |
| 2012/0093408 A1 | 4/2012 | Tang et al. |
| 2012/0105202 A1 | 5/2012 | Gits et al. |
| 2012/0130632 A1 | 5/2012 | Bandyopadhyay et al. |
| 2012/0143495 A1 | 6/2012 | Dantu |
| 2012/0235865 A1 | 9/2012 | Nath et al. |
| 2013/0096817 A1 | 4/2013 | Fauci et al. |
| 2013/0131985 A1 | 5/2013 | Weiland et al. |
| 2013/0166195 A1 | 6/2013 | Bandyopadhyay et al. |
| 2013/0166198 A1 | 6/2013 | Funk et al. |
| 2013/0166202 A1 | 6/2013 | Bandyopadhyay et al. |

FOREIGN PATENT DOCUMENTS

| | | |
|---|---|---|
| WO | WO 2006/017266 A2 | 2/2006 |
| WO | WO 2008/108788 A2 | 9/2008 |
| WO | WO 2009/021068 A1 | 2/2009 |

(56) References Cited

FOREIGN PATENT DOCUMENTS

| WO | WO 2010/082827 A2 | 7/2010 |
|---|---|---|
| WO | WO 2011/144966 A1 | 11/2011 |

OTHER PUBLICATIONS

U.S. Appl. No. 14/262,627, filed Apr. 25, 2015, Funk et al.
U.S. Appl. No. 61/783,642, filed Mar. 14, 2013, Kordari et al.
U.S. Appl. No. 13/616,350, filed Sep. 14, 2012, Bandyopadhyay et al.
U.S. Appl. No. 60/954,112, filed Aug. 6, 2007, Bandyopadhyay et al.
U.S. Appl. No. 61/049,020, filed Apr. 30, 2008, Bandyopadhyay et al.
International Patent Application No. PCT/US2014/24881; Int'l Preliminary Report on Patentability; dated Feb. 26, 2015; 6 pages.
AGNC Coremicro.RTM. AHRS/INS Unit Specification, GSA Contract No. GS-24F-0014K, .Copyright 1986-2006, American GNC Corporation, 1 page.
Atair Aerospace Circinus Overview, GPS-Integrated IMU, http://www.atairaerosoace.com/circinus/, .Copyright 2008, Atair Aerospace, Inc., 4 pages.
Australian Patent Application No. 2007348326—Examiner's Report dated Oct. 8, 2010, 2 pages.
Bailey, Tim, et al., "Simultaneous Localization and Mapping (SLAM): Part II", Tutorial, IEEE Robotics & Automation Magazine, Sep. 2006, pp. 108-117.
Bennewitz et al., "Adapting Navigation Strategies Using Motions Patterns of People", Proceedings of the 2003 IEEE International Conference on Robotics & Automation, Taipei, Taiwan, Sep. 14-19, 2003, pp. 2000-2005.
Brown et at., "Performance Test Results of an Integrated GPS/MEMS Inertial Navigation Package", Proceedings of ION GNSS 2004, Long Beach, California, Sep. 2004, 8 pages.
Cross et al., "Intelligent Navigation, Inertial Integration, Double Assistance for GPS", GPS World, May 1, 2002, 7 pages.
Cyganski et al., "Performance Limitations of a Precision Indoor Positioning System Using a Multi-Carrier Approach", ION NTM 2005, San Diego, California, Jan. 24-26, 2005, p. 1093-1100.
Desouza et al., "Vision for Mobile Robot Navigation: A Survey", IEEE Transactions on Pattern Analysis and Machine Intelligence, Feb. 2002, vol. 24(2), 237-267.
Diebel, "Simultaneous Localization and Mapping with Active Stereo Vision", Proceedings of 2004 IEEE/RSJ International Conference on Intelligent Robots and Systems, Sendai, Japan, Sep. 28-Oct. 2, 2004, pp. 3436-3443.
Doucet et al., "Monte Carlo Methods for Signal Processing: A Review in the Statistical Signal Processing Context", IEEE Sional Processino Magazine, Nov. 2005, pp. 152-170.
Durrant-Whyte, Hugh, "Uncertain Geometry in Robotics", IEEE Journal of Robotics and Automation, Feb. 1988, vol. 4(1), pp. 23-31.
Durrant-Whyte, Hugh, et al., "Simultaneous Localization and Mapping: Part 1", Tutorial, IEEE Robotics & Automation Magazine, Jun. 2006, pp. 99-108.
European Patent Application No. 08797306.1—Supplementary European Search Report dated Aug. 28, 2012, 8 pages.
European Patent Application No. 08797306.1—Extended Search Report, dated Sep. 5, 2012, 9 pages.
Foxlin, "Intertial Head-Tracker Sensor Fusion by a Complementary Separate-Bias Kalman Filter", Proceedinas of VRAIS '96, .Copyright. 1996 IEEE, p. 185-194.
Foxlin, "Pedestrian Tracking with Shoe-Mounted Inertial Sensors", Moving Mixed Reality into the Real World, published by the IEEE Computer Society, Nov./Dec. 2005, p. 38-46.
Godha et al., "Integrated GPS/INS System for Pedestrian Navigation in a Signal Degraded Environment", ION GNSS 2006, Fort Worth, Texas, Sep. 26-29, 2006, 14 pages.
Group 1 Solutions, Inc. Press Release, "Remote AccessTM Showcased at Fire Rescue International Advanced Technology Center", Sep. 15, 2006, 1 page.
Honeywell HG1900 MEMS IMU (Inertial Measurement Unit), "Next-Generation Inertial Measurement Unit Provides Sophisticated Guidance for Tactical Military Applications," Honeywell, .Copyright. 2004, Mar. 2005, 2-page brochure.
International Patent Application No. PCT/US2007/13039—Int'l Written Opinion mailed Sep. 10, 2008, 3 pages.
International Patent Application.No. PCT/US2008/72378—International Preliminary Report on Patentability mailed Feb. 9, 2010, 4 pages.
International Patent Application No. PCT/US2008/72378—Int'l Written Opinion mailed Nov. 3, 2008, 3 pages.
Jensfelt, P., et al., "A Framework for Vision Based Bearing Only 3D SLAM", Proceedings of the 2006 IEE International Conference on Robotics and Automation, Orlando, Florida, May 2006, pp. 1944-1950.
Langelaan et al., "Passive GPS-Free Navigation for Small UAVs", IEEEAC Paper No. 1132, .Copyright. 2005 IEEE, 9 pages.
Lee et al., "A Performance Analysis of a Tightly Coupled GPS/Inertial System for Two Integrity Monitoring Methods", .Copyright 1999, The MITRE Corporation, Center for Advanced Aviation System Development (CAASD), Mclean, Virginia, 14 pages.
Life-Line Wireless Environment & Safety Monitoring System, .Copyrgt.2006, Safe Environment Engineering, http://www.safeenv.com, one page.
MEMSense .mu.IMU Micro Inertial Measurement Unit, Series Documentation, Document DN00009, Revision 2.8, Nov. 2007, 12 pages.
MEMSense nIMU Nano Inertial Measurement Unit, Series Documentation, Document DN00010, Version 2.9, Nov. 2007, 15 pages.
Miller, "Indoor Navigation for First Responders: A Feasibility Study", Wireless Communication Technologies Group, Advanced Networking Technologies Division, Information Technology Laboratory, National Institute of Standards and Technology, Feb. 10, 2006, 56 pages.
Montemerlo et al., "Conditional Particle Filters for Simultaneous Mobile Robot Localization and People-Tracking", Proceedings of the 2002 IEEE International Conference on Robotics & Automation, Washington, D.C., May 2002, p. 695-701.
Park et al., "Fast Distance Computation with a Stereo Head-Eye System", BMCV 2000, LNCS 1811, .Copyright 2000, pp. 434-443.
Se et al., "Vision-Based Global Localization and Mapping for Mobile Robots", IEEE Transactions on Robotics, vol. 21(3), Jun. 2005, 364-375.
Singapore Patent Application No. 200808868-4—Search Report performed by the Australian Patent Office dated Oct. 29, 2009, 4 pages.
Singapore Patent Application No. 200808868-4—Second Written Opinion performed by the Australian Patent Office dated Jul. 5, 2010, 7 pages.
Singapore Patent Application No. 200808868-4—Written Opinion performed by the Australian Patent Office dated Oct. 29, 2009, 6 pages.
U.S. Appl. No. 11/756,412—U.S. Final Office Action dated Feb. 4, 2011, 38 pages.
U.S.Appl. No. 11/756,412—U.S. Non-Final Office Action dated Jun. 21, 2010, 22 pages.
U.S. Appl. No. 11/756,412—U.S. Non-Final Office Action dated Oct. 26, 2009, 8 pages.
U.S. Appl. No. 11/756,412—U.S. Notice of Allowance dated Aug. 29, 2012, 21 pages.
U.S. Appl. No. 12/187,067—U.S. Final Office Action dated Aug. 22, 2012, 11 pages.
U.S. Appl. No. 12/187,067—U.S. Non-Final Office Action dated Dec. 9, 2010, 5 pages.
Yi et al., "An Omnidirectional Stereo Vision System Using a Single Camera", Copyright 2006, IEEE, 6 pages.
Spassov, "Algorithms for Map-Aided Autonomous Indoor Pedestrian Positioning and Navigation," PhD Thesis, Ecole Polytechnique Federale de Lausanne (EPFL), Lausanne, Publ. No. 3961, 2007, 139 pgs.
Spassov et al., "Bayesian Approach for Indoor Pedestrian Localisation". In Proc. of the 6th Swiss Transport Research Conference, Ascona, Switzerland, Mar. 15-17, 2006, 14 pgs.

(56) References Cited

OTHER PUBLICATIONS

Spassov, I. et al. "Map Matching for Pedestrians via Bayesian Inference". In Proceedings of the European Navigation Conference-Global Navigation Satellite Systems, Manchester, UK, May 7-10, 2006, 10 pgs.

Clipp; "Simultaneous Localization and Mapping"; Comp 790-072 Robotics, PowerPoint Presentation; no date; 47 slide pages.

AHRS440 MEMS-Based AHRS System, Crossbow, Document Part No. 6020-0087-02 Rev B, 2-page brochure. [No Date].

Cyganski, D., et al., "WPI Precision Personnel Locator System Indoor Location Demonstrations and RF Design Improvements", Electrical and Computer Engineering Department, Worcester Polytechnic Institute, 2007, pp. 511-521.

Lemaire, Thomas, et al., "A Practical 3D Bearing-Only SLAM Algorithm", Intelligent Robots and Systems; 2005 LAAS-CNRS, Toulouse, France, 6 pages.

Montemerlo, Michael, et al., "FastSLAM 2.0: An Improved Particle Filtering Algorithm for Simultaneous Localization and Mapping that Provably Converges", Proceedings of IJCAI; 2003, 6 pages.

Smith et al., "Estimating Uncertain Spatial Relationships in Robotics", SRI International, [no date]. 26 pages.

\* cited by examiner

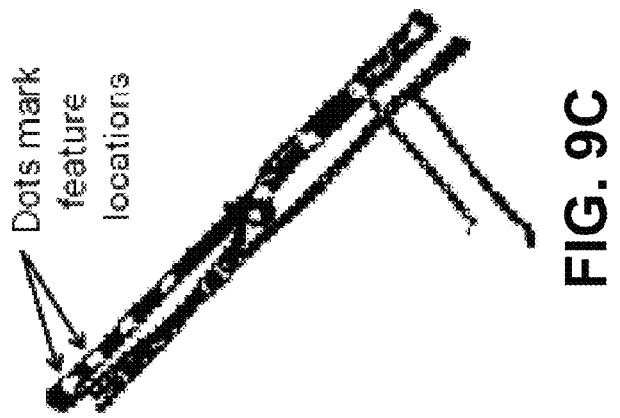
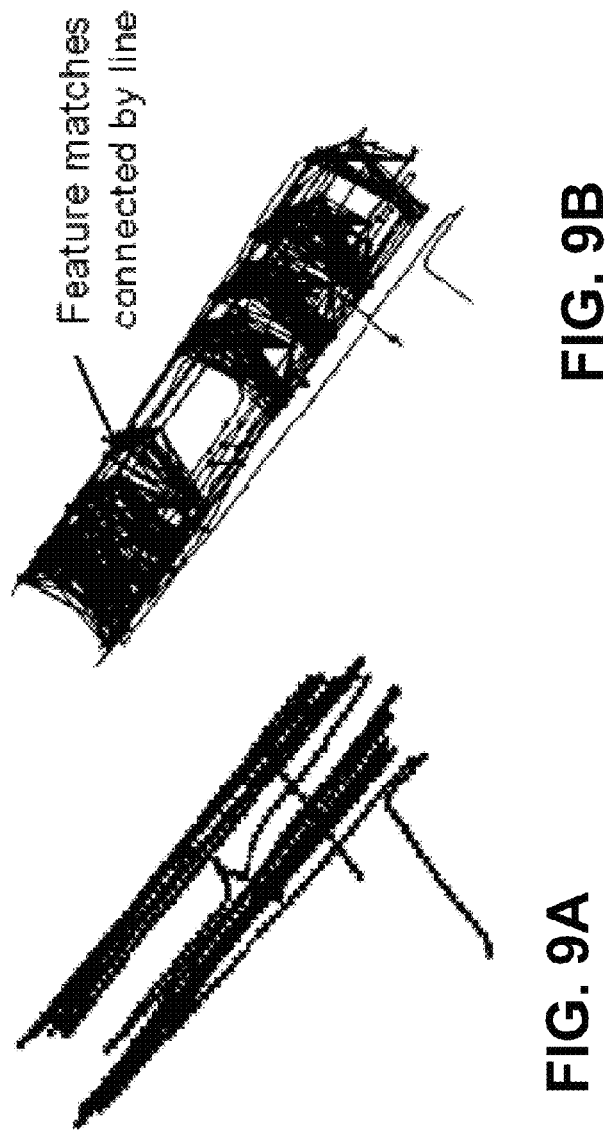

Mapped Stairwell Correction

Mapped Elevator Correction

CROWD SOURCED MAPPING WITH ROBUST STRUCTURAL FEATURES

CROSS REFERENCE TO RELATED APPLICATIONS

This application claims priority to Provisional U.S. Patent Application No. 62/100,458, filed on Jan. 6, 2015, and is a continuation-in-part application of PCT Application No. PCT/US2013/044852, filed Jun. 7, 2013, which claims priority to U.S. patent application Ser. No. 13/852,649, filed Mar. 28, 2013, now U.S. Pat. No. 8,751,151, issued Jun. 10, 2014, which claims benefit under 35 U.S.C. §119(e) of Provisional U.S. Application No. 61/658,697, filed Jun. 12, 2012, and Provisional U.S. Patent Application No. 61/799,659, filed Mar. 15, 2013, all of which are incorporated herein by reference in their entireties.

This application is also a continuation-in-part application of U.S. patent application Ser. No. 14/178,605, filed Feb. 12, 2014, which claims benefit under 35 U.S.C. §119(e) of Provisional U.S. Patent Application No. 61/783,642, filed Mar. 14, 2013, the contents of which are incorporated herein by reference in their entireties.

This application is related by subject matter to that which is disclosed in U.S. patent application Ser. No. 11/756,412, filed May 31, 2007; U.S. patent application Ser. No. 12/187,067, filed Aug. 6, 2008; U.S. patent application Ser. No. 13/301,491, filed Nov. 21, 2011; U.S. patent application Ser. No. 13/616,323, filed Sep. 14, 2012; U.S. patent application Ser. No. 13/616,350, filed Sep. 14, 2012; U.S. patent application Ser. No. 13/616,370, filed Sep. 14, 2012; and U.S. patent application Ser. No. 13/616,408, filed Sep. 14, 2012, the entirety of each application is hereby incorporated by reference herein.

GOVERNMENT RIGHTS

The subject matter disclosed herein was made with government support under award/contract/grant number IIP-1353442, awarded by the National Science Foundation, IIP-1214461, awarded by the National Science Foundation, and W31 P4Q-10-C-0166, awarded by the Defense Advanced Research Projects Agency. The Government may have certain rights in the herein disclosed subject matter.

TECHNICAL FIELD

This disclosure relates generally, but not exclusively, to location and mapping services.

BACKGROUND INFORMATION

Without correction of the generated data, sensors associated with a mobile device, such as a cellular phone, are inherently subject to various sources of error, including: inertial drift; magnetic interference; and the like. As a result of such error, the sensors may provide degraded information and subsequently poor location accuracy over any reasonable duration when used indoors.

BRIEF DESCRIPTION OF THE DRAWINGS

FIGS. 9A, 9B, and 9C are illustrations depicting an original detected path, the matching of magnetic features to the original path, and the correction to the original path based on the matches in accordance with an embodiment.

DETAILED DESCRIPTION OF EMBODIMENTS

Figure 1:
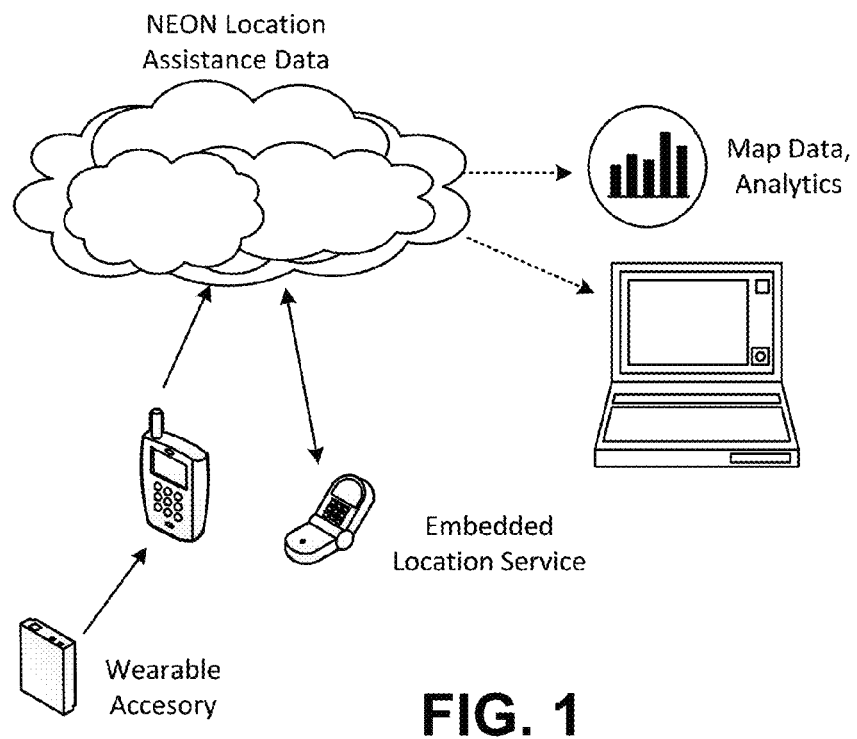
FIG. 1 is a diagram of a location system in accordance with an embodiment.
Figure 2:
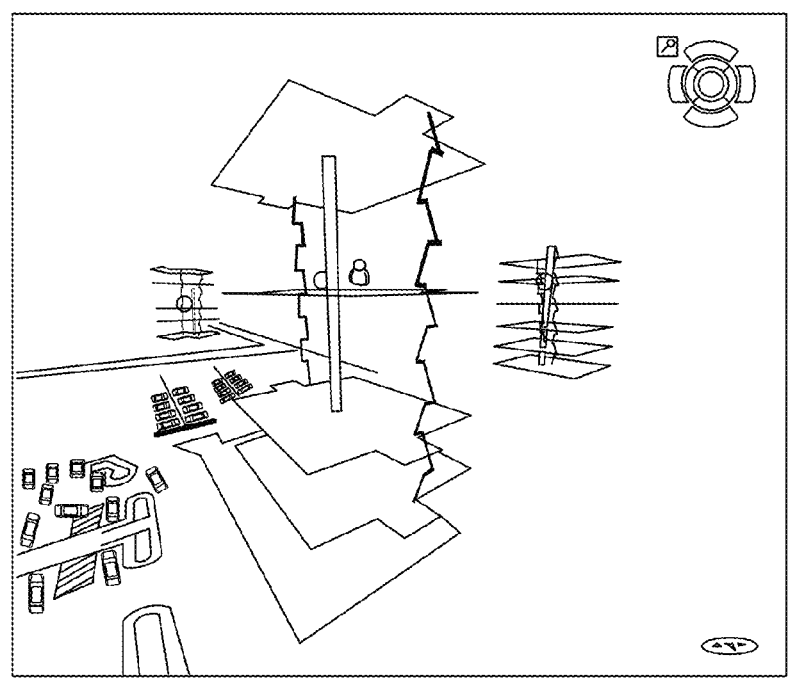
FIG. 2 is an illustration of detected structural features popped up on a map in accordance with an embodiment.

In accordance with the present disclosure, navigation maps may be used to improve indoor location and heading accuracy by providing critical location corrections. The created navigation maps can be built and maintained on a mobile device or sent to a server (e.g. a location assistance data server) to be fused with structural features provided by other mobile devices and shared with other users. In some embodiments, map processing may be performed by the server. As will be described further herein, structural features for inclusion in the map may then be determined based, in part, on inertial tracking of a subject's movements. FIG. 1 depicts an exemplary system and software architecture for an implementation where features are detected on a mobile device (e.g. cell phones or wearable accessories) and sent to a Location Assistance Data Server where feature maps are created and shared. In some embodiments, one or more functions may be distributed to a mobile device (e.g. a smartphone), including: location processing; map feature detection; and matching, as illustrated in FIG. 2.

Crowdsourced Feature Mapping

One goal of crowd-sourced feature mapping is to detect and describe unique structural features of a building based, in part, on data provided by one or more tracked devices moving through that building. Building models created, in part, from the detected structural features have many applications, including: improved location; navigation; routing; and building visualization. In an embodiment, a feature descriptor associated with a detected structural feature may comprise sufficient descriptive information about to uniquely identify the detected structural feature. The descriptive information may include physical information about the detected structural feature (e.g. height, location, color, etc.); signal data associated with the detected structural feature's environment (e.g. radio frequency ("RF"), magnetic field ("EMI"), vibration, and acoustic signals); and image data.

For example, a structural feature may be initially detected from inertial data of a user (i.e., strong acceleration can indicate the start of an elevator). This detection and can be a trigger for a scan to record other differentiating information in the environment, such as RF signals (Wi-Fi and Bluetooth) or magnetic signatures (for example, sudden changes in magnetic field strength). Alternatively, the detection time could serve as a reference for aggregating similar data being continuously collected in some window around that timestamp. The inertial description of the structural feature can be combined with signal and other data and sent to a central processor as a structural feature descriptor.

If the inertial system has enough information to calculate absolute altitude (meters above sea level), then the feature descriptors can be correlated in three dimensions ("3-D") to other know features in a global map. If the inertial system can only provide a measure of relative altitude, than all features in the same structure (e.g. building, tunnel, ship) among different users can be correlated into a local map but they must be offset to the altitude of some reference, e.g., a floor. By keeping track of the altitude of the first feature detected upon entry to a structure, all subsequent features can be offset to that value, which puts their locations in the relative reference frame of the structure. If a structure has multiple entrance floors, however, then floor matching using other signal information is required to determine if a detected floor is the reference floor.

Figure 7:
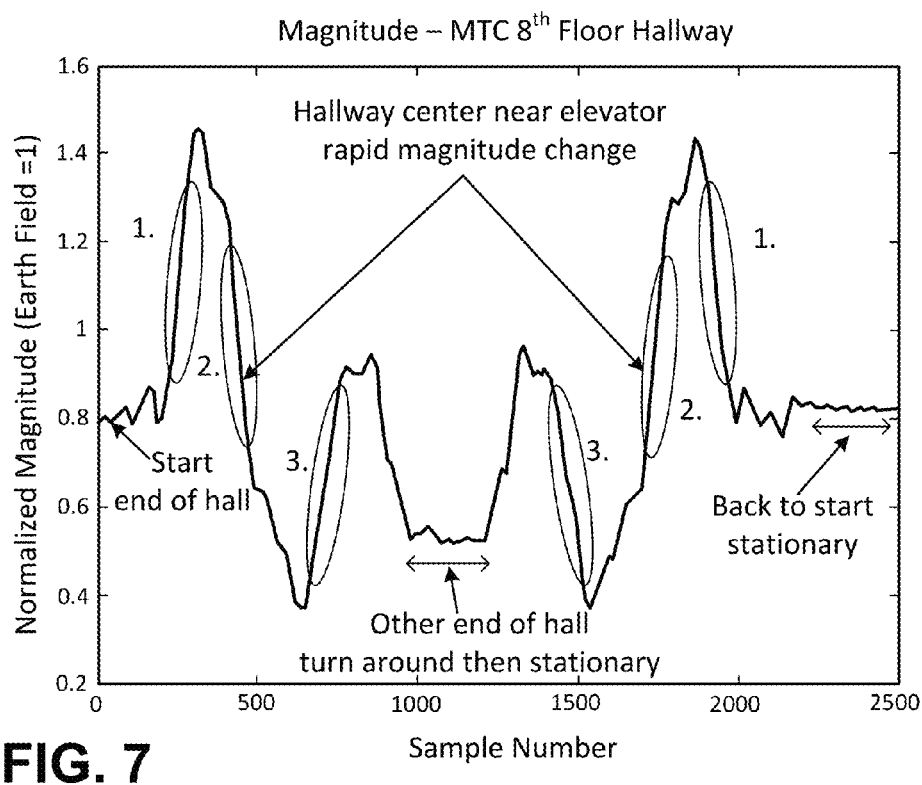
FIG. 7 is a graph depicting the repetition of certain magnetic features during a hallway traversal in accordance with an embodiment.

FIG. 7 shows the basic feature detection and mapping algorithms block diagram for structural features. Structural feature detection is done in the location engine where there is access to high sample rate sensor data. The map fusion algorithms are separate and take feature input from one or more location engines.

Once a structure map is created, devices can match newly detected features to the map to provide location correction. The map information can also be used for routing and navigation, or map visualization.

The ability to match newly detected structural feature(s) to structural feature(s) on an intended route provides a mechanism for automatically confirming adherence to the route. In the case of route adherence, the features should be traversed in an expected order and with known interval (e.g. distance between features). Expected route information can be used to reduce search space for features in the map (for example, searching outside the route only if the expected route feature is not a match). Additional information such as route shape, number and order of features traversed and matched can also be used to improve route adherence confidence.

In the next sections, examples of structural feature information and also Wi-Fi and magnetic signal descriptors that could be added to the structural information (or used as independent features themselves) are described. Limited to the sensors available on cell phones, other data could be similarly collected and associated with structural features, for example, Bluetooth, cellular, global positioning system ("GPS"), acoustic, light, and image data. Allowing for additional sensors outside of the phone offers many additional possibilities including proprietary beacons, light detection and ranging ("LIDAR"), radiation sensors and more. Some of the data such as light may be sensitive to time of day so matching mechanisms would need to take the time into account in the matching process.

Structural Feature Descriptor Example

As discussed above, structural features may be inferred based, at least in part, on inertial data associated with tracked device movements. When a structural feature is detected, feature messages generated by the system adhere to a general format, as illustrated in commonly owned U.S. Pat. No. 8,751,151, which is incorporated by reference herein, with the addition of some unique parameters to describe specific features. The feature messages generated by the system indicate the location of corresponding features on the path by start and end times; provide unique index increments for each new feature element; and provide feature construction parameters. An exemplary feature message associated with a detected hallway feature may comprise such feature construction parameters as: hallway width, hallway length, and the like. An exemplary feature message associated with a detected stairwell feature may comprise a feature construction parameter that describes at least one of the exemplary stairwell types including: straight; switchback; triangle; square; and curved. In an embodiment, a feature message associated with a detected stairwell feature may comprise a feature construction parameter that describes a winding classification, such as clockwise up or counterclockwise up.

Also, for each building feature, two kinds of feature messages are generated which can be referred as "parent messages" and "child messages". The "child messages" describe the parts of a feature, e.g., the "child message" for a stairwell describes a flight of the stairwell. The "parent messages" describe the summary of the whole feature, e.g., the "parent message" for a stairwell describes the complete stairwell (configuration, up-rotation, etc.) and may be generated by the system after a tracked device leaves the feature area.

In the case where there are two stairwells that are both "U-Shaped", the stairwells may have different up-winding rotations that structural information alone is able to uniquely identify. To identify locations within the stairwell, however, more signal information may be needed. By using a combination of structural and signal based information, traversed stairwell segments may be located between two floors to provide a 3-D location correction.

Wi-Fi Signal Data Feature Descriptor Example

Discovered structural information or other signal information such as magnetic signal data collected from low power sensors may be used to trigger collection of radio frequency ("RF") data (or other, e.g. image and acoustic data). Using such a trigger may save power by not requiring continual scanning of RF sources. It also provides unique identification data for structural and other signal data features. Considering the strength of Wi-Fi signals, this may also work equally well for Bluetooth or other types of RF signals, and even better if time of arrival data is available. For example, a broadcasted Wi-Fi descriptor might include an access point ID (e.g. basic service set identification ("BSSID"), and signal strength information (e.g. RSSI), level, etc). Once it has been determined that a user has entered a building, i.e., a feature, a measurement can be initiated.

An example of how it is possible to differentiate based on Wi-Fi is as follows. A data set of Wi-Fi signatures was collected at 21 locations in a four-story office building. In this example, the twenty-one locations include three locations in the central hallway of each floor and in stairwells located at either end of the central hallways. Table 1 lists the assigned collection number and location.

TABLE 1

Data Collection Number - Location
Data Collection Locations

| | |
|---|---|
| 01 | stair south 1st floor |
| 02 | stair south 2nd floor |
| 03 | stair south 3rd floor |
| 04 | stair south 4th floor |
| 05 | stair north 1st floor |
| 06 | stair north 2nd floor |
| 07 | stair north 3rd floor |
| 08 | stair north 4th floor |
| 09 | hall north 1st floor |
| 10 | hall mid 1st floor |
| 11 | hall south 1st floor |
| 12 | hall south 2nd floor |
| 13 | hall mid 2nd floor |
| 14 | hall north 2nd floor |
| 15 | hall mid 3rd floor |
| 16 | hall south 4th floor |
| 17 | hall mid 4th floor |
| 18 | hall north 4th floor |
| 19 | exit main 1st floor |
| 20 | exit back 1st floor |
| 21 | exit south 1st floor |

Figure 3:
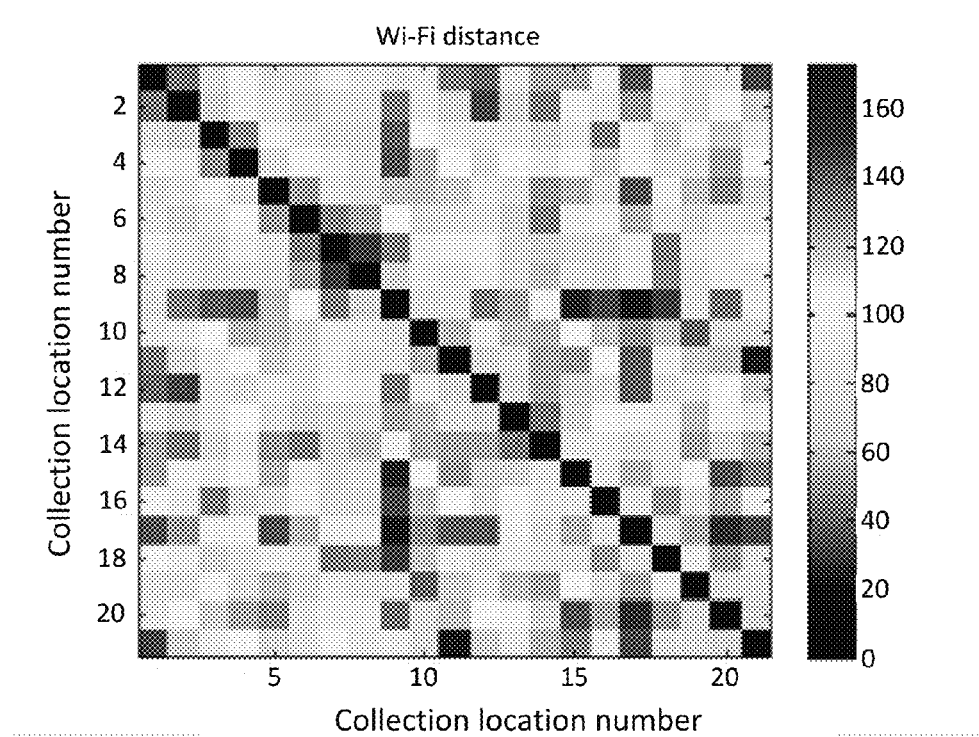
FIG. 3 is a graph illustrating feature to feature comparison in accordance with an embodiment.

FIG. 3 shows an exemplary similarity matrix of the Wi-Fi descriptor matching output when comparing each Wi-Fi signature in the dataset with other Wi-Fi signatures in the database and the result plotted using a color map. In FIG. 3, dark blue indicates a good match (e.g. ~0% difference), whereas dark red indicates a poor match. Looking along a row (or column), each Wi-Fi signature's similarity to other signatures in the building may be seen. As expected, the dark blue diagonal indicates each Wi-Fi signature matches well with itself, as indicated by the diagonal line from top left to bottom right. Likewise, signature 1, in the south stair on the first floor, also matches well with signatures 11 and 21, the south hall on the first floor and the south exit on the first floor; respectively, which makes sense due to their close proximity.

Figure 4:
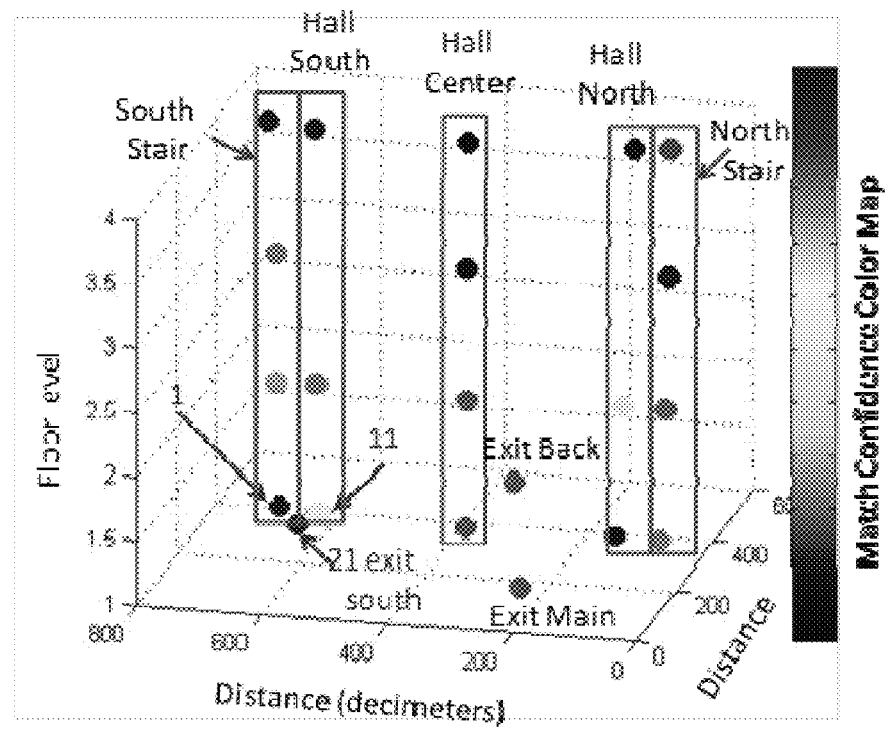
FIG. 4 is a graph illustrating matches to building features in accordance with an embodiment.

FIG. 4 shows the results of an exemplary test collection at location 1 (south stair on the first floor). Match confidence is show by color map at each collection location shown on the 3-D plot of the building. The color of signatures 1 and 21 indicates a match, with the south stair and south hall of the second floor being fairly close matches, the south hall a little less close of a match, and most other points not indicating much of a match at all.

This data demonstrates that by taking Wi-Fi scans at the end of each flight of stairs it is possible to uniquely differentiate both stairwells and stairwell segments, enabling the system to provide both location and elevation information.

Magnetic Signal Data Feature Descriptor Example

There may also be differences in magnetic signature data when traversing paths indoors, such as hallway features. In such a case, with a line of sight from one spot in the hallway to the next, Wi-Fi may not be as strong of a differentiator within the feature, while magnetic signatures may enable improved differentiation.

Figure 5:
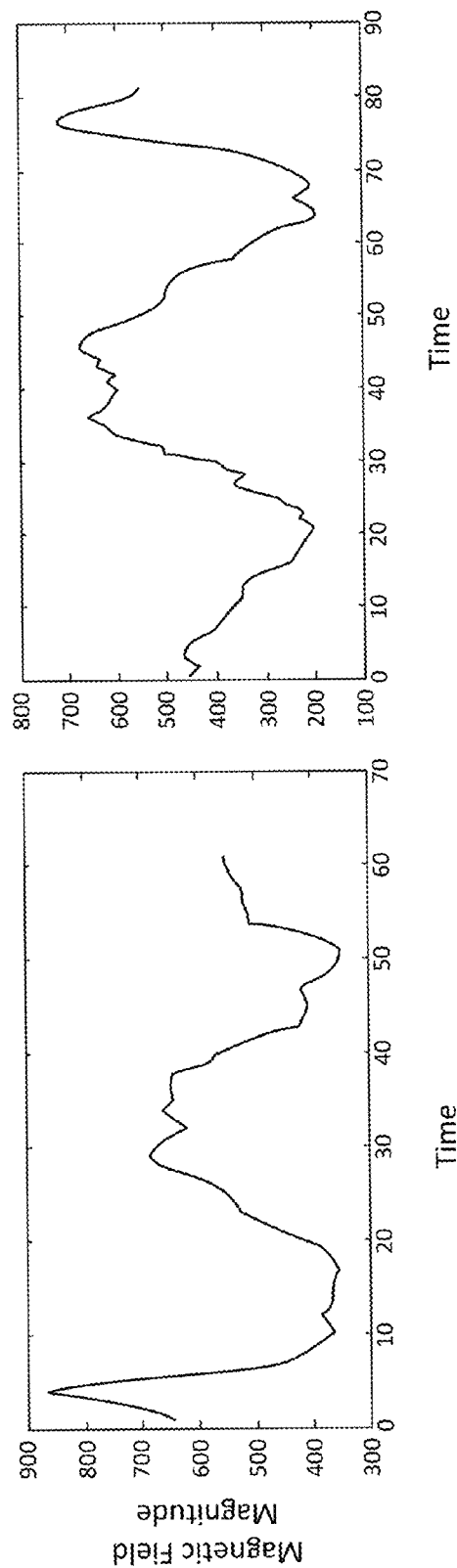
FIG. 5 is a graph depicting magnetic field magnitude recordings along a hallway traversed from one end to the other and back in accordance with an embodiment.

One approach to using magnetic information for location purposes may be to continually sample and record the magnetic field as magnetic signatures. Recorded magnetic signatures may be matched to magnetic signatures associated with a previously recorded map. FIG. 5 depicts exemplary magnetic field magnitude plots over time obtained by a tracked device traversing a hallway. The left image in FIG. 5 shows magnetic field magnitude data recorded when traversing the hallway in one direction and the right image in FIG. 5 shows magnetic field magnitude data recorded from traversing the same hallway in the opposite direction. Magnetic field magnitude data recorded as such should be a strong match, if a constant speed is maintained when traversing the hallway in each direction.

Figure 6:
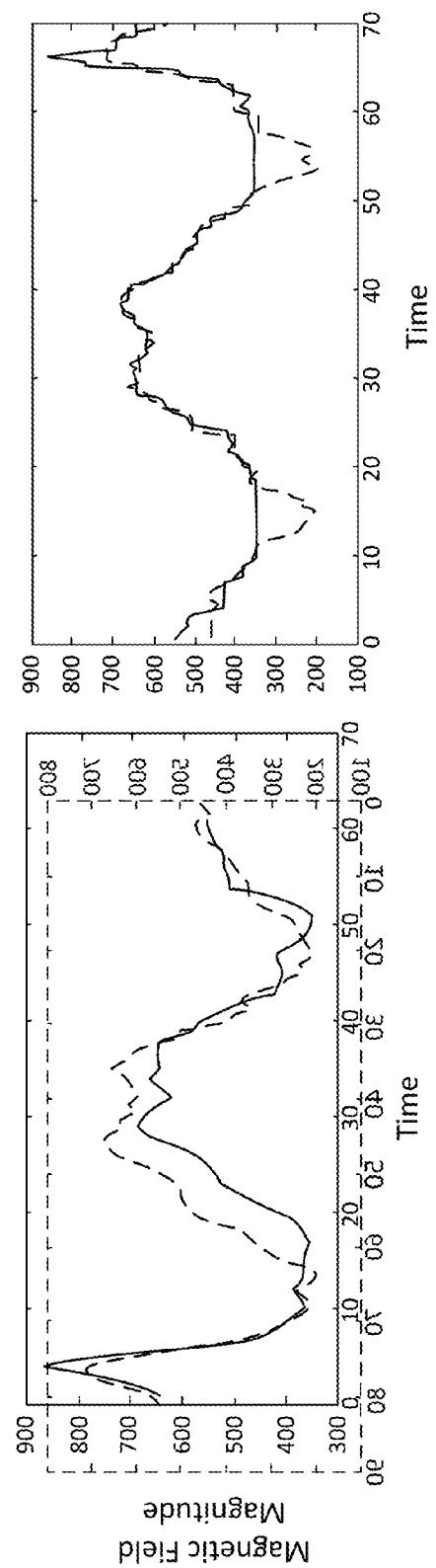
FIG. 6 is two images of comparisons of the recordings from FIG. 5

However, slight variations exist between the magnetic field magnitude data signals recorded by the two traversals, as shown by the left image of FIG. 6 in which the left image of FIG. 5 has been overlaid by a flipped and aligned version of the right image of FIG. 5. As illustrated by the left image of FIG. 6, slight variations in traversal speeds make simple comparisons like this problematic. One approach to compensate for traversal speed variations may be to use dynamic time warping to improve match velocity. The right image of FIG. 6 shows a similar view as the left image of FIG. 6 with an improved matching of the magnetic signatures achieve via dynamic time warping. Yet, computational complexity or bandwidth requirements for map sharing may be problematic when using dynamic time warping to improve match velocity.

One possible solution to minimize these potential computational complexity or bandwidth requirement issues may be to compress information within magnetic field magnitude data recordings by considering only important characteristics of magnetic field magnitude data. In an embodiment, only transitions in magnetic field magnitude data that exceed a predetermined threshold rate are recorded. In this embodiment, computational complexity or bandwidth requirements for map sharing may be reduced. FIG. 7 depicts an exemplary magnetic signature obtained by a tracked device traversing a hallway in a forward direction and returning down the same hallway in a reverse direction opposite of the forward direction. As shown by FIG. 7, three sharp transition features (designated by circled areas of the magnetic signature) are substantially similar as the tracked device traverses the hallway in both the forward and reverse directions.

Looking at each magnetic anomaly alone may not be robust, but associating the series of anomalies with a feature such as a hallway may help to improve the hallway's uniqueness. In an embodiment, a sequence of magnetic features may be dynamically collected as a path is traversed. When a structural feature is detected, the set of magnetic features detected during traversal of the structure may be associated with the structural feature (e.g., hallway, elevator, etc.) to improve uniqueness. Structural features may be reported by start time, stop time, feature ID, feature descriptor, or a combination thereof. Start times and stop times may be used in conjunction with the inertial path (or other fused path) to resolve location. Detected structural features may also be matched against other structural features of the same type in a database (e.g. the search may be limited to be within the location error bounds, a known building, or a planned route). When two structural features are compared, the magnetic feature match may be scored based on a percent of matched features, an offset between matching features, a difference between feature magnitudes, or a combination thereof.

Figure 8:
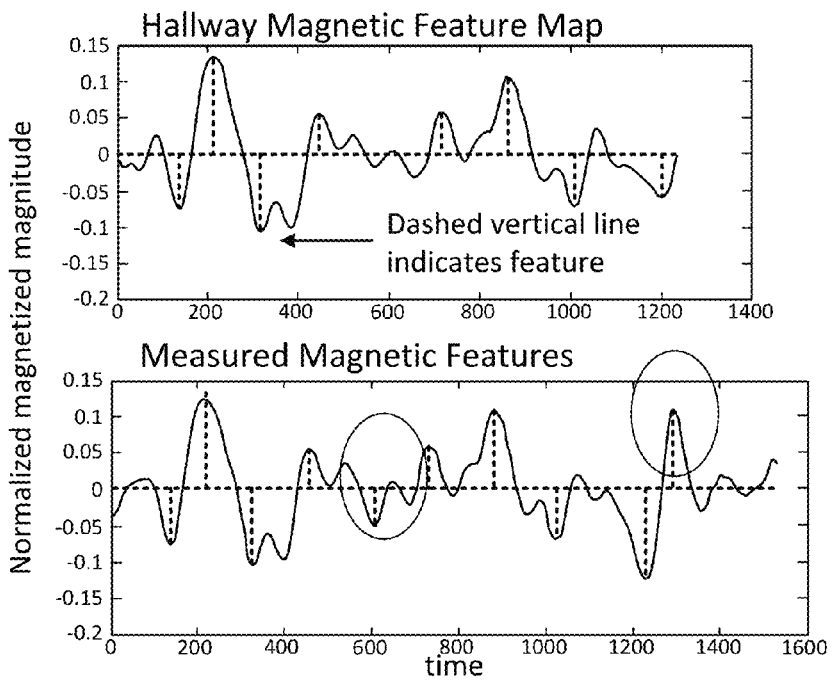
FIG. 8 is a graph comparing determined features to measured magnetic features in accordance with an embodiment.

When performing magnetic matching for a structural feature, it may be important to note that: (1) variability in measured magnetic magnitude may cause magnetic features to be missed; and (2) variability in detected structural feature start times and stop times may cause magnetic features to be present or absent at the beginning or end of the detected structural feature. The top image in FIG. 8 shows a magnetic feature map associated with a hallway feature, while the bottom image of FIG. 8 shows the measured magnetic features that were associated with the hallway feature when traversed during a test. In both figures, the magnetic features are indicated by vertical lines and the raw magnetic data is also shown for reference. Note that two features are present in the measured data set shown in the bottom image were not present in the mapped features shown in the top image. The first feature not being present in the top image may be due to variability in measured magnetic magnitude. The second feature not being present in the top image may be due to variability in a detected structural feature stop time.

Various factors may contribute to variability in measured magnetic magnitude. For example, disturbances in the environment (e.g., other people, objects) may be one factor that contributes to such variation. Another contributing factor may be the coarseness of the prior map. For example, if a 1 dimensional ("1-D") set of representative features is taken as the tracked device traverses the hallway based on a central measurement, traversing closer to one side of the hallway (or the other) may result in a magnitude change.

Figure 10C:
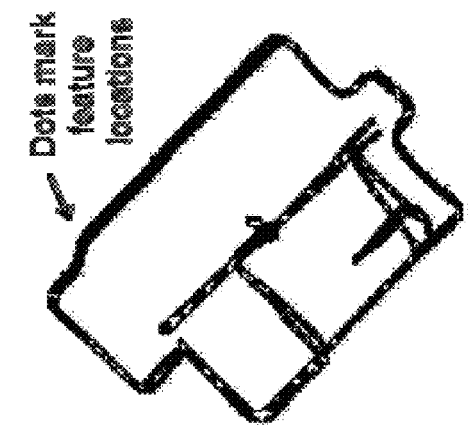
FIGS. 10A, 10B and 10C are illustrations depicting an original detected path, the matching of magnetic features to the original path, and the correction to the original path based on the matches in accordance with an embodiment.
Figure 10B:
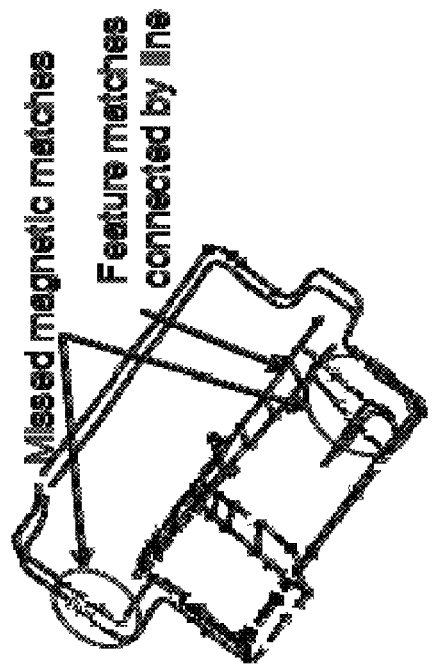
Figure 10A:
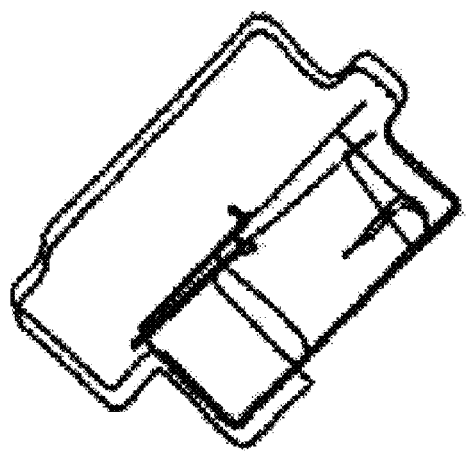

FIGS. 9A-9C and FIGS. 10A-10C show examples of the feature match results from the test discussed above. FIGS. 9A and 10A show an original track before matching; FIGS. 9B and 10B show the original track with detected feature matches connected with lines; and FIGS. 9C and 10C show the track after feature corrections have been enforced. FIGS. 9A-9C depict test results for a track were the tester started in an office and traversed the central hallway on two different floors multiple times and then returned to the starting point. In the corrected track of FIG. 9C, dots represent locations for each of the matched features from the test. As shown by FIG. 9, two hallways may be differentiated based on their corresponding magnetic features.

The exemplary test results depicted by FIGS. 10A-10C represent a track where a tracked device started on the 4th floor of an office building, proceeded down a central hallway, descended to a ground level of the office building, and traversed an outer loop encircling the office building in close proximity. As shown by the exemplary test results depicted by FIGS. 10A-10C, some magnetic feature matches were missed in both the indoor and outdoor segments of the track. One potential explanation for these missed magnetic feature matches may be small modifications to the techniques disclosed herein that were adapted to minimize false positives. While detectable features outside of and in close proximity to the office building may be useful for matching, there may be an increased likelihood of missing magnetic signature matches of outside features. Also, detectable magnetic features outdoors and further away from buildings (e.g. in normal pedestrian areas) may be less prevalent.

In some embodiments, associating magnetic features with structural features may enable detected structural feature differentiation, which may improve the ability to make autonomous map matches for map creation and map based location corrections. A relative consistency of magnetic signatures notwithstanding different sensors, different positions of a structural feature (e.g. different positions in a hallway), different sensor holding locations, variations of furnishings, different months of the year, and the like may contribute to this improvement. In an embodiment, significant variations in magnetic signatures may be accounted for by utilizing magnetic matches to confirm a structural feature map, while not rejecting otherwise acceptable matches based on magnetic matches.

Structural Feature Matching

An exemplary hierarchical method for feature matching is described below. In this example, the method involves matching features of the same type (e.g. stair, elevator, and the like) by hierarchically assessing scores in three categories: Location; Structure; and Other Sensor/Signal Data. Scoring in the Location category may be based on location and error bound of both features, such as: horizontal error bound overlap; elevation error bound overlap; and number of features likely within the error bounds. Scoring in the Structure category for stairwell features may comprise: the winding $\{0,1\}$; the configuration options (e.g. straight, switchback, triangle, square, curved) $\{0,1\}$; and the average flight height (i.e. average over entire feature) $\{0,1\}$. Scoring in the Other Sensor/Signal category may sample on flight detection, such as: Wi-Fi (e.g. feature vector match and traversal order match); Magnetic (e.g. feature vector match and traversal order match); Lighting (e.g. lighting match—that may be affected by time of day); and Image (e.g. feature descriptor match).

A similarity score may be computed in each category, starting from the location category. If the location proximity score meets a threshold, only then may the score for the next category be computed. Otherwise, the function may return with a non-match result. If the threshold is met or exceeded, the score for the next category may be computed and so on. The result may be a combination of the individual category scores.

In an embodiment, the location data may be helpful for both feature matching and merging. However, even without location information, matching may be achieved with structural and signal information in many cases. Information associated with one or more of the Structure data, Other Sensor/Signal data may be used for initialization without knowing the location in advance. Some idea of a general area (e.g. based on a network constraint or intended location/route information) may help to limit the search.

Location Score

A location score may be based on the location of two features and their error bounds. The location score may have three components: horizontal error bound overlap; elevation error bound overlap; and the number of features likely within the error bounds.

In an embodiment, there may be a requirement for overlap in horizontal location in order for the features to be compared. For example, in the case of stairs, from the start and end location of each flight and the corresponding error bounds, a location and error bound (bounding circle) for the stair is computed. In an embodiment, there may not be a requirement for overlap in horizontal location in order for the features to be compared. For example, two segments of a long hallway may not overlap. Horizontal error bound overlap may be a number between 0 and 1. For example, a stair with a bounding circle with area $a1$ and a stair with a bounding circle with area $a2$ may have a horizontal overlap score determined by:

$$\text{Horizontal Overlap Score} = \text{Overlap Area}/\min(a1, a2)$$

In an embodiment, there may be a requirement for overlap in elevation (vertical) location in order for features to be compared. Elevation error bound overlap may be a number between 0 and 1 that may be determined by:

Elevation Overlap Score=overlap height/min(height (feature1),height(feature2))

A feature density score may be a function of a constant parameter (FEATURE_PER_SQ_METER) representing a number of unique features expected in a given area. For example, if one stairwell is expected in a 75 m² area, FEATURE_PER_SQ_METER may be defined as 1/(75 m²) for stairwells. A feature density score may be a number between 0 and 1 that may be determined by:

$$\text{Feature Density Score} = \begin{cases} 1, & \text{Total Area} < \text{FEATURE\_PER\_SQ\_METER} \\ \dfrac{1}{\text{Total area} * \text{FEATURE\_PER\_SQ\_METER}}, & \text{Otherwise} \end{cases}$$

Where:
Total Area=a1+a2−Overlap Area
Structure Score

As an example, a structure score for stairwells may be computed based on three criteria: winding; configuration; and average flight height. In an embodiment, a match for stairwell features is required for the winding and configuration criteria. In this embodiment, the structure score is based on a match in the average flight height criterion.

A winding criterion for stairs may be defined according to the rotation direction (clockwise or counterclockwise) when ascending the stairs. If the winding criterion (i.e. rotation directions) for stairs does not match, then a non-match result may be returned. Otherwise, if the winding criterion for stairs does match, then the configuration criterion may be checked.

A set of possible configurations for stairwells, as depicted in Figure #, may comprise: straight; switchback; triangle; square; and curved. In an embodiment, a configuration match is required to proceed. In an embodiment, where a switchback configuration was classified as triangular (e.g. due to a combination of high drift and wide turn angle on the switchback), a configuration match may not be required. In this embodiment, defining a distance between adjacent configurations may be used.

If both the winding and configuration criteria match, an average flight height may be computed for each stairwell by dividing the total height over the number of flights. A structure score for the average flight height criterion may be determined by:

$$s = 1 - (|h1 - h2|/2d)$$

Where:
d=a measurement accuracy of flight height;
h1=an average height of a first stairwell feature; and
h2=an average height of a second stairwell feature.

Hallways and elevators may have less structure data associated with them, so this part of the matching may be less complex. For example, structure data for hallways may comprise heading information, and structure data for elevators may comprise entry direction information. In embodiments utilizing other sensor types, additional structure data may be added for hallways, elevators, or both. For example, in embodiments utilizing a camera, structure data for hallways may include hallway width.

Sensor and Signal Data

An exemplary method of determining a matching score will now be discussed for Wi-Fi scans. However, the exemplary method may be similarly implemented for other forms of sensor and signal data. In this example, a difference vector between two Wi-Fi scans may be determined by generating a vector where each element of the vector corresponds to at least one access point observed by either of the two Wi-Fi scans. In an embodiment where an access point is observed in both of the two Wi-Fi scans, the value may be set as the difference between the received signal strength indication ("RSSI") values of the two Wi-Fi scans. In an embodiment where an access point is only observed in one of the two Wi-Fi scans, then the element may be set as the difference between the observed RSSI value of the two Wi-Fi scans and a weakest acceptable RSSI value (e.g. −90 db). In this embodiment, a distance (d) between the two Wi-Fi scans ($x^1$ and $x^2$) may then be determined as the magnitude of a difference vector divided by the difference vector's size:

$$d(x^1 \text{ and } x^2) = \frac{1}{\text{size}(B_1) + \text{size}(B_2) + \text{size}(B_3)} \sqrt{\sum_{i \in B_1}(-90 - x_i^1)^2 + \sum_{i \in B_2}(-90 - x_i^2)^2 + \sum_{i \in B_3}(x_i^1 - x_i^2)^2}$$

Where:
$B_1$=a set of BSSIDs observed only by the first Wi-Fi scan;
$B_2$=a set of BSSIDs observed only by the second Wi-Fi scan;
$B_3$=a set of BSSIDs observed by both of the Wi-Fi scans; and
$x_i^j$=an RSSI value from BSSID i in Wi-Fi scan j.

In some embodiments, stairwell features have a Wi-Fi scan for each flight of stairs completed that may be defined by a start time and a stop time. In some embodiments, elevator features have a Wi-Fi scan for each trip completed, which may be defined by a start time and a stop time. Information associated with Wi-Fi scans in these embodiments may assist in determining where a particular segment fits in elevation when the corresponding segment covers only a portion of a feature (e.g. a stairwell feature or an elevator feature). As an example, features representing 1 to 4 and 3 to 6 overlap only on 3 to 4. If $d_{ij}$ denotes a distance between a Wi-Fi scan from feature 1 stair flight i and a Wi-Fi scan from feature 2 stair flight j. An overlap may be determined by selecting a minimum d of an average Wi-Fi scan distance for each possible overlap. The order of the flights may be reversed, but it may be assumed that each flight is detected. Finally, a Wi-F Score may be determined by:

$$\text{Wi-Fi Score} = \begin{cases} 0, & d > \tau \\ 1 - \dfrac{d}{\tau}, & d \leq \tau \end{cases}$$

Where:
$\tau$ is currently set to 10 db.

Elevation matching may be more complex for elevators since a trip may cover multiple floors of a building.

Match Performance Example—Stairwells

A set of 23 stairwell features were extracted from test paths taken in a first building (Building 1) and an adjacent second building (Building 2) to test a match performance of the exemplary method discussed above. The test paths of this example included four different stairwells. Each extracted stairwell feature descriptor in this example is based on path data started when a tracked device enters a stairwell at some floor level, continuing as the tracked device proceeded up or down a varying number of flights, and ended when the tracked device exited the stairwell. In this example, the test paths were limited to the 1st to 6th floors of each building. Each of the stairwells in this example had a switchback configuration. In each building, the winding of stairwell 1 is clockwise and the winding of stairwell 2 is counter clockwise.

The stairwell features (ground truth) were as follows:
7 features (1-7) were in Building 1, stairwell 1;
5 features (8-12) were in Building 1, stairwell 2;
6 features (13-18) were in Building 2, stairwell 1; and
5 features (19-23) were in Building 2, stairwell 2.

Figure 11:
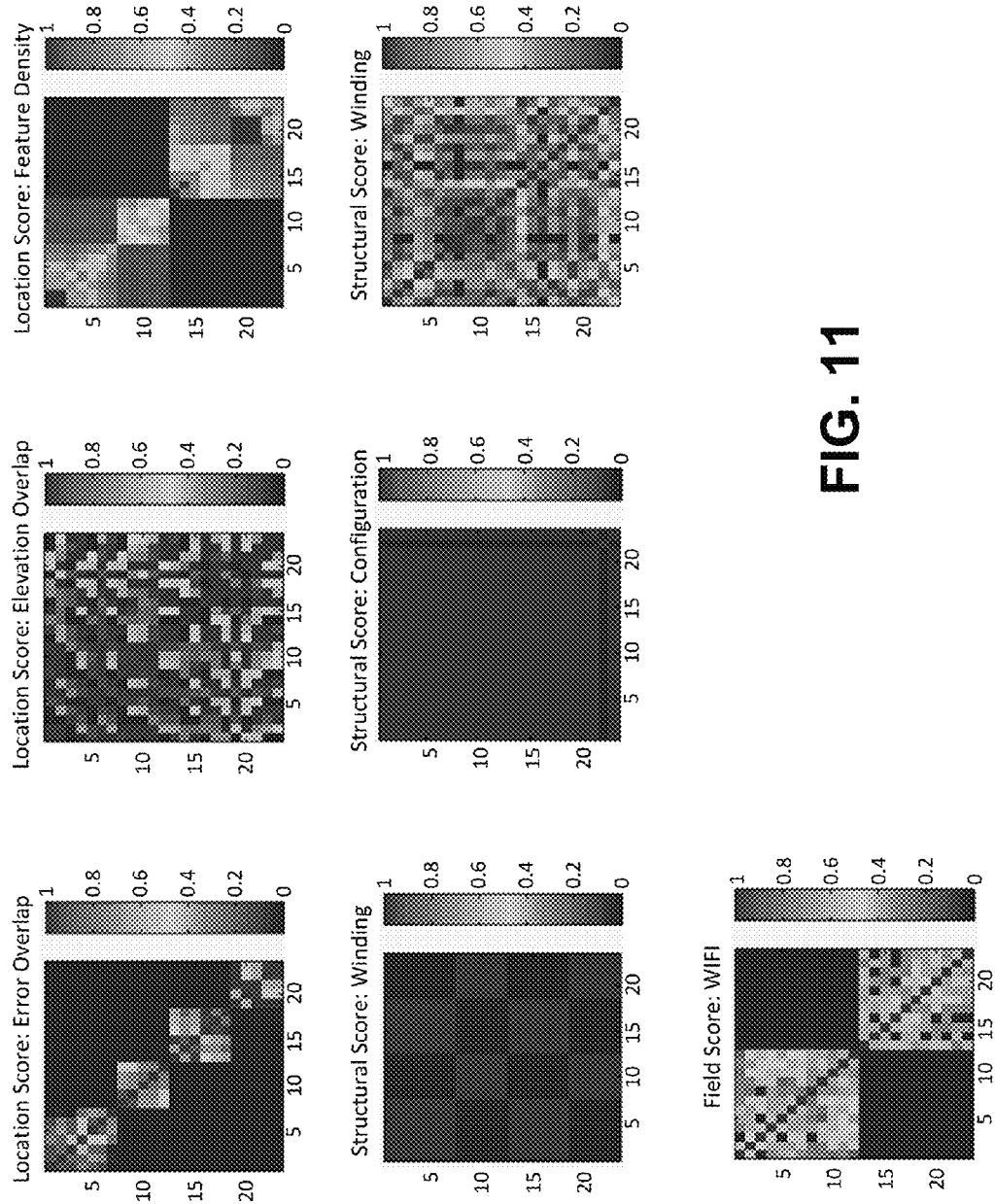
FIG. 11 is an illustration of different feature match scores developed in accordance with an embodiment.

Each of the stairwell features 1-23 were then compared with all other stairwell features. FIG. 11 depicts match scores for each category in a similarity matrix indexed by the feature number on the vertical and horizontal axes. A diagonal from top left to bottom right corresponds to a feature being compared with itself. As shown by FIG. 11, the horizontal location score (top left of FIG. 11) effectively distinguishes stairwells. While there were no false positives in this exemplary test, there were some misses for building 1, stairwell 1. Also, elevation overlap (top middle of FIG. 11) may be difficult to decipher in some instances since some features within a particular stairwell may not overlap in elevation, whereas features within other stairwells may overlap in elevation. The feature density score, depicted in the top right of FIG. 11, effectively differentiates buildings. Note that for some features with larger error bounds, the match score may be low even when a feature is compared to itself.

FIG. 11's similarity matrices demonstrate that the disclosed method is particularly effective in detecting and matching stairwell windings (middle left). The structural configuration matches were also generally good (middle of FIG. 11). However, in this exemplary test, there was one error involving feature 22, which was incorrectly classified as triangular due to high drift and low turn angle the corresponding stairwell. The tests paths were in buildings with the same flight height so one would expect, as is depicted, the flight height score (middle right of FIG. 11) to be high (shading in the upper range of the guide) for the entire table. Determined flight heights for some test paths in this exemplary test may not have accurately reflected actual flight heights of corresponding stairwells. In an embodiment, improved detection of a flight's start time, end time, or a combination thereof may improve flight height determinations.

Wi-Fi scores determined according to aspects of the disclosed methods, (bottom left) may be used to both effectively distinguish between buildings and contribute to differentiating among stairwells within a particular building. In building 1, the effectiveness of using Wi-Fi information for stairwell signal separation was diminished because there was line of sight between stairwells within building 1. There was no line of sight between stairwells within building 2, and differentiation in the Wi-Fi score improved. In some embodiments, Wi-Fi information may also be useful for matching elevation.

Figure 12:
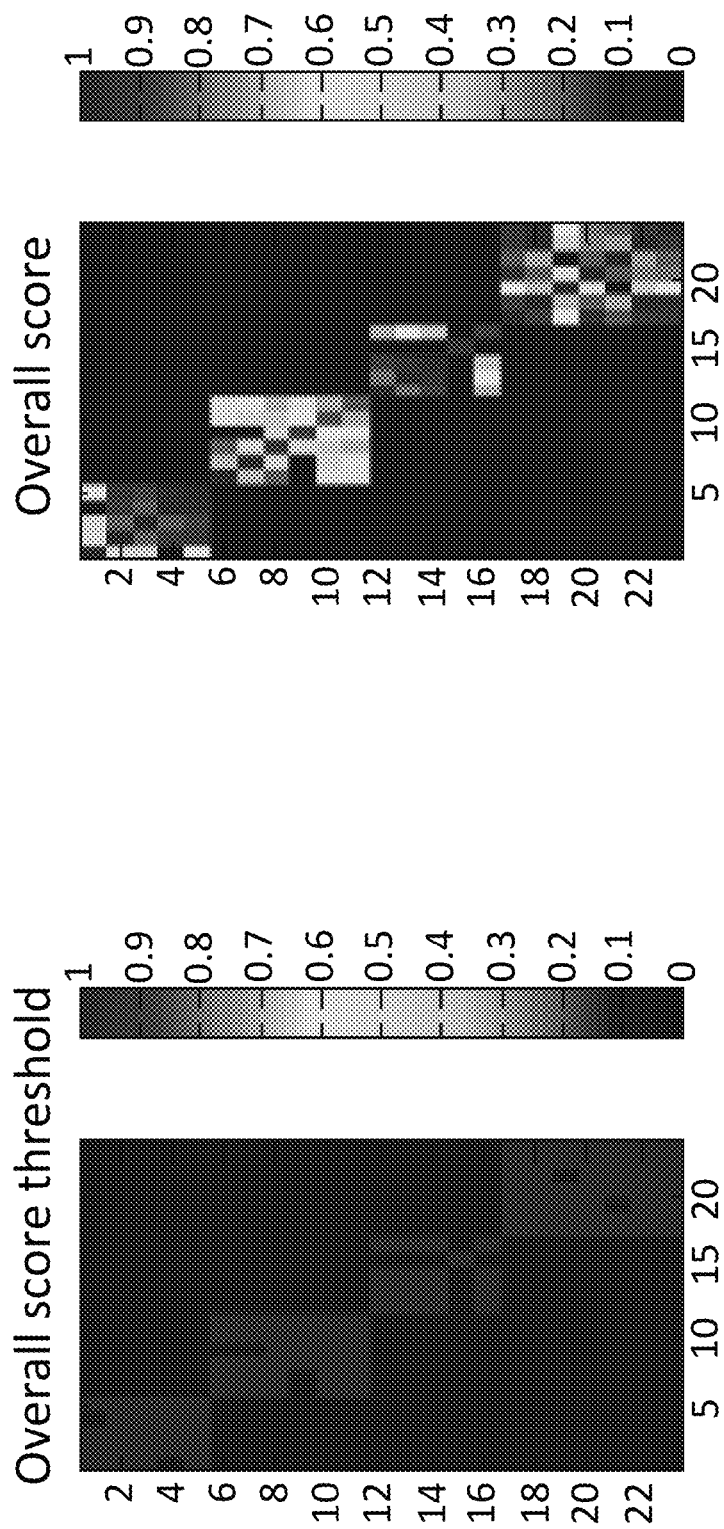
FIG. 12 is an illustration of overall feature match score thresholds compared to overall feature match scores based on FIG. 11.

In FIG. 12, the right image shows overall feature match scores from the exemplary test discussed above, and the left image shows match decisions made based upon the overall feature match scores. As shown by the left image of FIG. 12, some matches were missed in this test as each of the diagonal boxes should be completely filled. In some instances, missed matches may occur when the stairwells either do not overlap in elevation or only overlap by a minimal amount. The left image of FIG. 12 also demonstrates that there were no false positives returned in this exemplary test.eb;normal
Structural Feature Merging As discussed above, one use of detecting structural features according to the embodiments disclosed herein is to combine detected structural features together to create a global map (e.g. a structure map). If a newly detected structural feature does not match a structural feature already in a global map, the newly detected structural feature may be added to the global map. If a newly detected structural feature does match a structural feature already in a global map, information associated with both the newly detected structural feature and the structural feature already in the global map may be merged. Merging information associated with both structural features may provide such benefits as improving structural feature location accuracy and providing a more complete description of the structural feature.

In an embodiment, one or more quality control filters may be used when merging structural features maintain the accuracy of global maps by ensuring that crowdsourced data will converge and not be affected by inaccurate detections. Quality control filtering may be used to minimize the inclusion of inaccurate structural feature detections comprised of faulty data, excessive errors, or other similar issues that may cause the accuracy of the detected structural feature to be suspect. Exemplary quality control filters for individual structural feature types are discussed in greater detail below.

Other quality controls may be implemented to improve the stability or accuracy of a global map. In an embodiment, a merge score may be determined for a newly detected structural feature to weight the effect that information associated with newly detected structural features will have on existing information about a corresponding structural feature already included in the global map. Such weighting values may be assigned using one or more of an error bounds, structural feature extent (e.g. hall or stair length), and number of structural features merged. As an example for a stairwell feature, a merge score may be determined as a function of a sum of a merge count of each flight individually. This may provide a higher weight (higher merge score) to the template (global map) if many structural features have already been merged. It also may provide higher weight (higher merge score) to longer stairwells.

Feature Detection, Filtering, Matching and Merging

Exemplary methods for structural feature detection, quality control filtering, matching, and merging are described below for different structural feature types. Structural feature detection may be based, in part, on different methods depending on the availability of sensors. For example, some of the exemplary methods below are described using inertial and pressure data since these sensors are generally available in smartphones. Also, sensors providing inertial and pressure data may be less power intensive than other sensors (e.g. image sensors), which may enable structural feature detection techniques to be running in an 'always on' background mode.

Elevation Features

Elevation features such as stairwells, elevators, escalators and ramps may be detected based on pressure changes, inertial data, and magnetic signatures. In an embodiment, a generic elevation change may be detected according to any of the techniques disclosed herein. In this embodiment, the generic elevation change may be classified as a specific type of structural feature based on data collected during feature traversal. For example, the generic elevation change may be classified using a machine learning techniques, such as neural networks or any other known classification technique. Data collected during feature traversal may include: rate of change of elevation; acceleration variance; magnetic variance; an average short term elevation variance (e.g. as calculated by pressure); an elevation as measured at the start (or end) of the structural feature; duration of the structural feature traversal; and the like.

Stairwells

In an embodiment, stairwell detection may be based on up (or down) stair steps or pressure change. For stairwells, location information and signal data may be included in the descriptor for each flight traversed, which may enable 3-D matching. One or more of start position, end position, and error bound for each flight as well as winding and stairwell configuration of the stairwell as a whole may be detected and recorded during a stairwell feature traversal. In an embodiment, signal data associated with each flight may be detected and recorded. For example, a Wi-Fi scan may be initiated at the start position of every flight of stairs.

As discussed above, quality control filtering may be used to minimize the inclusion of inaccurate structural feature detections in a global map. Such quality control filtering may prevent detected structural features that do not meet specified quality standards from being merged into a global map. For example, quality control filters for stairwell features may be adapted to ensure that:

- All flights are taken in the same direction (e.g. all up or all down).
- Each flight has signal data (e.g. RF, magnetic) associated with it that may be used to match flights. For example, a quality control filter may be designed to ensure that at least one Wi-Fi scan is associated with a flight. (Note, a scan may be taken where no Wi-Fi access points are detected).
- A stairwell location error bound does not exceed a threshold value. For example, a minimum position error for positions associated with the stairwell is less than 15 meters.
- A distance traveled during all flights exceeds a threshold value (e.g. greater than 0.5 meters).
- An altitude change during all flights exceeds a threshold value (e.g. greater than 0.5 meters).
- A start and end altitude of a stairwell is consistent with a predetermined metric (e.g. a total altitude of the flights divided by the number of flights).
- Orientations of flights are consistent with a detected configuration.

Quality control filters such as these may simplify matching contiguous sections of a stairwell with a global map or adding new stairwell features if a matching structural feature does not already exist in the global map. Including details of detected structural features may facilitate 3-D localization of structural features. For example, a location of a tracked device traversing a segment of a stairwell may be corrected to the location of a stairwell and an appropriate floor using such details.

In an embodiment, matching stairwells features may utilize factors based on one or more of the following: location, structure, and signal/sensor data. For example, Location—A location-based factor may ensure that the location of detected stairwells is similar. In an embodiment, this factor may be enforced by requiring a two dimensional ("2-D") error radius of detected stair features to overlap or be within a specified distance (e.g. 10 meters). In an embodiment, an altitude may not need to match or overlap since features may be different sections of the same stairwell.

Structure—A structure-based factor may ensure that matching stairwell features have similar structural characteristics. For example, matching stairwells should have the same winding, configuration (e.g. U-shaped, radial), and similar flight height.

Signal/sensor data—A signal/sensor data-based factor may be used to facilitate matching. For example, if the altitudes of two detected stair features do overlap, by comparing one or more signal signature sequences (e.g. Wi-Fi scans, magnetic signatures, image features) collected for each flight a best flight-by-flight match may be identified.

In an embodiment, some aspects of merging stairwell features may occur in 2-D and while some may occur in 3-D. In an embodiment, aspects of merging stairwell features in 2-D may occur prior to aspects occurring in 3-D. In an embodiment, in 2-D, a new stairwell segment's location and error bounds is adjusted, weighted by an error radius, and a merge score of the merged feature is determined. Weighting by the error radius may enable structural features with smaller error bounds to have more effect on a merged structural feature than structural features having larger error bounds.

In 3-D, if no flights match the new stairwell segment based on signal/sensor data matching (e.g. matching Wi-Fi scans, magnetic signatures, or Bluetooth), a new stairwell segment is added as long as doesn't overlap in elevation with the merged feature. If the new stairwell segment does overlap in elevation with existing segments of the merged feature and the signal/sensor data for the flights does not match, then the segment with more information (i.e. a higher merge score) is chosen and the segment with less information (i.e. a lower merge score) is eliminated. If new stairwell segments do match to any segments, then segments are adjusted based on a merge score weighted average distance between them. In an embodiment, signal/sensor data information may be merged and add any additional flights above and below the new stairwell segments may be added. If a new stairwell segment matches two existing segments, then a continuous segment may result.

Figure 13:
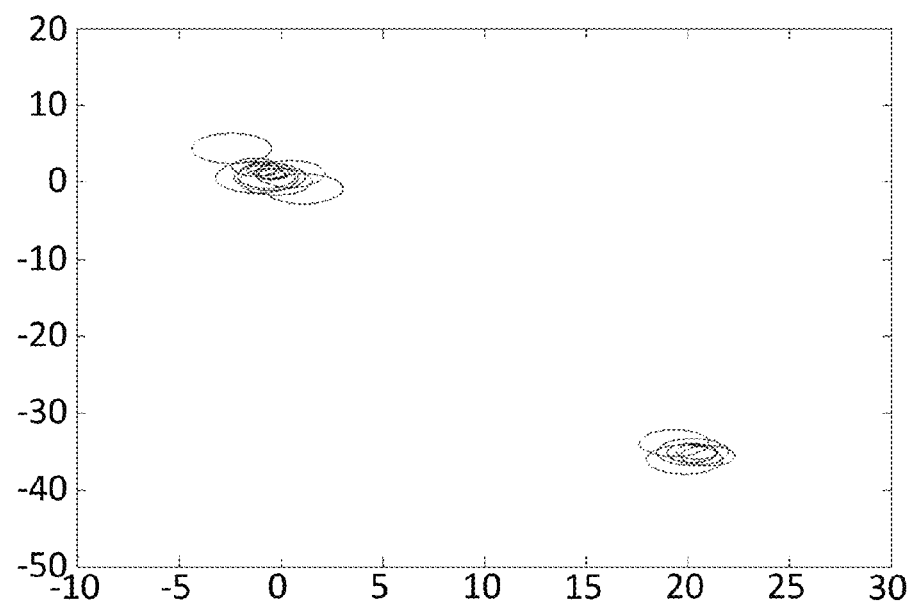
FIG. 13 is an illustration of error data associated with stairways in accordance with an embodiment.
Figure 14:
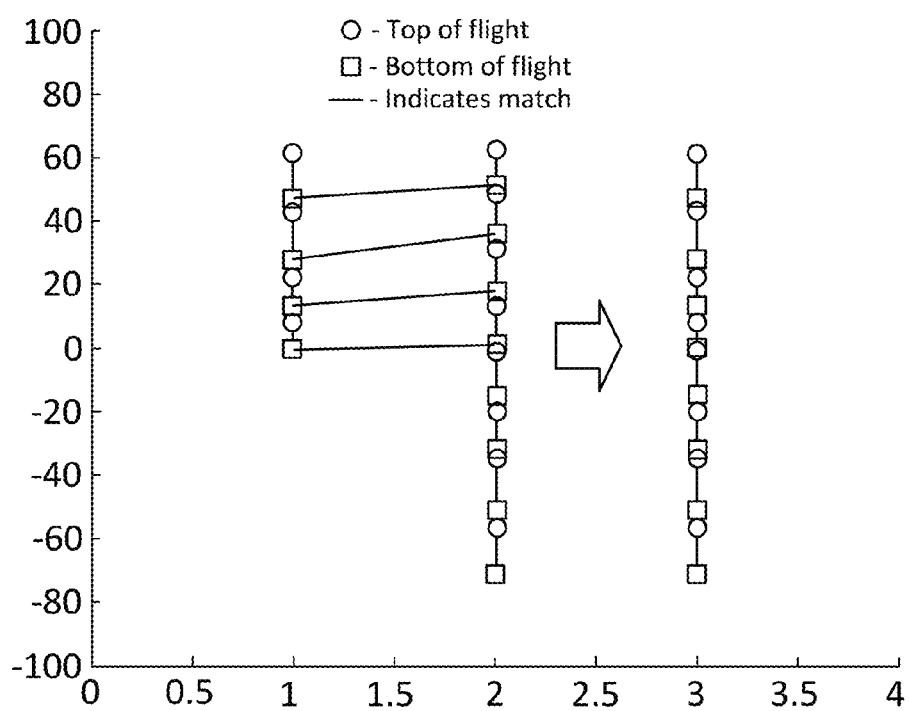
FIG. 14 is an illustration of the application of vertical flight elevation matching data to the error data of FIG. 13.

FIGS. 13-14 depict location data for horizontal and vertical components of stairwell features obtained from test data. The left image of FIG. 14 shows two detected stairwell features, with the lines indicating a match of one stairwell flight to another stairwell flight. The right image of FIG. 14 shows the resulting merged stairwell feature template. In the merged stairwell feature template depicted by the right image of FIG. 14, the flight heights (the segment between the top darker colored+symbols and the bottom lighter colored+symbols) are not all of equal length. This may occur due to missed stair detections delaying the flight start detection.

While escalator features may be similar to stairwell features, escalator feature detection mechanisms may slightly vary from stairwell feature detection mechanisms. For example, escalator features may have a lower number of structural variations than stairwell features. Accordingly, escalator feature detection mechanisms may require modification to account for such variances.

Elevator

Elevator trip detection may be based on sustained acceleration in an upward direction; sustained acceleration in a downward direction, changes in pressure, or a combination thereof. For example, when an elevator stops, a similar acceleration pattern may be seen in an opposite direction. Upon detection, an elevator feature may be uniquely identified using elevator entry direction, elevator exit direction, signal/sensor data (e.g., RF, magnetic), or a combination thereof that was detected during and around an elevator trip. For example, Wi-Fi scans may be initiated when a tracked device is substantially still (e.g. while waiting for an elevator), on detection of the elevator trip, at an end of the elevator trip, and after a specified distance of the elevator feature upon leaving the elevator (e.g. a few steps). One or more of these Wi-Fi scans (and corresponding elevations) may be associated with an elevator feature descriptor.

Similar to stairwell features, quality control filters may be used to minimize the inclusion of inaccurate elevator feature detections in a global map. For example, quality control filters for elevator features may be adapted to ensure that:

An elevator location error bound does not exceed a threshold value. For example, a minimum position error for positions associated with the elevator is less than 10 meters.

An elevation change during an elevator trip exceeds a threshold value (e.g. greater than 2 meters).

Each elevator trip has signal/sensor data associated with it. Signal/sensor data (e.g. RF and magnetic signatures) may be used to match segments in 3-D.

In an embodiment, matching elevator features may utilize factors based on one or more of the following: location, structure, and signal/sensor data. For example, Location—A location-based factor may ensure that the location of detected elevators is similar. In an embodiment, this factor may be enforced by requiring a 2-D error radius of detected elevator features to overlap or be within a specified distance (e.g. 10 meters).

Structure—A structure-based factor may ensure that matching elevator features have similar structural characteristics. For example, such structure-based factors may include similarity in entry/exit headings of matching elevator features, acceleration achieved by matching elevator features, and the like.

Signal/sensor data—A signal/sensor data-based factor may be used to facilitate matching elevator features. For example, such signal/sensor data-based factors may include: similar Wi-Fi matching at elevator entry and exit points, magnetic anomaly matching, and the like.

In an embodiment, some aspects of merging elevators features may occur in 2-D and while some may occur in 3-D. In an embodiment, aspects of merging elevator features in 2-D may occur prior to aspects occurring in 3-D. In 2-D, the merged elevator feature's location and error bounds are adjusted, weighted by an error radius, and the merge score of the merge feature is determined. In 3-D a minimum elevation and a maximum elevation for the elevator feature are tracked. In an embodiment, elevator trip segments may be matched in a similar manner as stair features to provide for 3-D location correction.

Hallways

In an embodiment, hallway detection may be based on a tracked device traversing a first threshold distance (e.g. 8 meters) in a first direction; without deviating more than a second threshold distance (e.g. 1.5 meters) in a second direction; and without an elevation change event occurring. In an embodiment, a first direction is not in parallel with a second direction. In an embodiment, a first threshold distance, a second threshold distance, or a combination thereof may be set to reflect a relative scale of the structural features being detected or the structure being mapped. For example, a first threshold for mapping a warehouse structure may be set higher than a first threshold for mapping an office structure. Feature descriptors associated with a hallway may include: a hallway length; orientation information; signal/sensor data associated with the hallway (e.g. magnetic signatures, RF data, Wi-Fi scans, Bluetooth beacons), locations associated with signal/sensor data, or a combination thereof. In an embodiment, any information included in a feature descriptor may include corresponding error values. In embodiments where image sensors or LIDAR are available, feature descriptors associated with a hallway may include one or more of hallway width estimates and hallway length estimates.

Similar to elevator features, quality control filters may be used to minimize the inclusion of inaccurate hallway feature detections in a global map. For example, quality control filters for hallway features may be adapted to ensure that:

Hallway feature start positions, end positions, or a combination thereof does not exceed a threshold error value. For example, a minimum position error for start (or stop) positions associated with the hallway feature are less than 15 meters.

A range of altitude values over the extent of a hallway feature does not exceed a threshold deviation value. For example, a range of altitude values as measured over the extent of a hallway feature is less than 1.5 m.

In an embodiment, an orientation line of a merged hallway may be defined prior to merging or matching hallway features. An orientation line may facilitated merging or matching segments of hallway features that do not overlap in 2-D (e.g. segments of long hallway features). In an embodiment, an orientation line of a merged hallway feature may be based on a weighted average of the hallway orientation with a weighting value being a function of a merge score determined for each hallway. Similar to stairwell features, a merge score may be higher for hallway features having a higher number of merges or a longer length than hallway features having a lower number of merges or a short length.

In an embodiment, matching hallway features may utilize factors based on one or more of the following: location, structure, and signal/sensor data. For example, Location—A location-based factor may ensure that an altitude difference over the full extent of a hallway feature does not exceed a threshold value (e.g. 2.1 meters). Another location-based factor may ensure that a start point (or end point) of a detected hallway feature fall within a predetermined threshold of a hallway feature merge line.

Structure—A structure-based factor may ensure that matching hallway features have similar structural characteristics. For example, an angle between hallway feature orientations does not exceed a threshold value (e.g. 30 degrees).

Signal/sensor data—A signal/sensor data-based factor may be used to facilitate matching hallway features. For example, when overlap magnetic anomaly sequence matching exists, Wi-Fi matching at key points, Bluetooth matching, hallway width from an image or other sensor, and the like may be used.

In an embodiment, merging hallways may comprise defining an orientation line of the merged hallway as discussed above. In this embodiment, hallway feature endpoints may be chosen that provide the longest hallway feature length. In an embodiment, matching magnetic anomaly features may be merged and located along an orientation line. In an embodiment, unmatched magnetic anomaly features may be added to an orientation line. In an embodiment, using signal/sensor data (e.g. RF or magnetic signature data), hallway features may provide location and heading corrections when a tracked device detects that it is in a known hallway.

Intersections

In an embodiment, intersection features may be formed between two hallway features. If a new hallway feature is detected with a start point at a last hallway feature's end point and an angle formed between new hallway feature and the last hallway feature is approximately 90 degrees, then an intersection feature may have been detected. In an embodiment, an intersection feature may provide a location correction each time the intersection feature is matched. An intersection feature descriptor may include: location; location error; associated hallway feature data; associated signal/sensor data (e.g. RF scans, Wi-Fi scans, Bluetooth low energy ("BLE") scans, or magnetic anomalies detected at the intersection feature), or a combination thereof.

Similar to hallway features, quality control filters may be used to minimize the inclusion of inaccurate intersection feature detections in a global map. For example, quality control filters for intersection features may be adapted to ensure that:

An intersection feature's location error bound does not exceed a threshold error value. For example, a minimum position error for positions associated with an intersection feature is less than 12 m.

An intersection feature has signal/sensor data associated with it.

In an embodiment, matching intersection features may utilize factors based on one or more of the following: location, structure, and signal/sensor data. For example, Location—A location-based factor may ensure that an altitude difference within an intersection feature does not exceed a threshold value (e.g. 1.5 m). Another location-based factor may ensure that a 2-D error radius of detected intersections overlap or are within a threshold distance (e.g. 10 m).

Structure—A structure-based factor may ensure that matching intersection features have similar structural characteristics (matching entrance or exit hallway features).

Signal/sensor data—A signal/sensor data-based factor may be used to facilitate matching intersection features (e.g. Wi-Fi scans, BLE scans, magnetic anomaly matching, and the like).

In an embodiment, intersections may be defined by a 3-D location. In this embodiment, determining a merged location of intersection features may be on a merge score weight average of altitude, position, error bounds, or a combination thereof. In an embodiment, hallway feature segments ending at an intersection feature (e.g. segments obtained by approaching an intersection feature from opposing ends of a hallway feature, then turning at the intersection feature) may be combined to form a single hallway feature passing through the intersection feature.

Entrances/Exits

In an embodiment, detection of entrances (or exits) features ("entrance features") of a structure may be based on changes in lighting, magnetic field behavior, GPS satellites and signal properties, cell signal strength, or a combination thereof. In an embodiment, an event may be triggered when an indicator toggles from a likely indoors state to a likely outdoors (or vice versa). In an embodiment, if a tracked device transitions outside of a structure, previous locations may be searched to identify the structure that the tracked device just left and the position at which the tracked device transitions outside may be identified as a location of an entrance feature. In an embodiment, if a tracked device transitions from outdoors to inside a structure, previous locations may be searched to identify the position at which the tracked device entered the structure, which is identified as an entrance feature. In an embodiment, a feature descriptor associated with an entrance feature may include: location, location error, signal/sensor data (e.g. RF signal properties—GPS, cell signal strength, Wi-Fi, BLE or other) and magnetic anomalies), or a combination thereof.

Similar to intersection features, quality control filters may be used to minimize the inclusion of inaccurate entrance feature detections in a global map. For example, quality control filters for entrance features may be adapted to ensure that:

An entrance feature's location error bound does not exceed a threshold error value. For example, a minimum position error for positions associated with an entrance feature is less than 11 m.

An Indoor-to-Outdoor or Outdoor-to-Indoor transition corresponds with a tracked device crossing a structure outline in an appropriate direction within a predetermined period of time (e.g. 30 seconds).

An entrance feature has signal/sensor data associated with it.

In an embodiment, matching entrance features may utilize factors based on one or more of the following: location, structure, and signal/sensor data. For example, Location—A location-based factor may ensure that an altitude difference within an entrance feature does not exceed a threshold value (e.g. 1.3 m). Another location-based factor may ensure that a 2-D error radius of detected entrance feature overlap or are within a threshold distance (e.g. 11 m).

Structure—A structure-based factor may ensure that matching entrance features have similar structural characteristics. For example, a transition direction associated with detected entrance features is appropriate based on a location of the transition (e.g. Outdoor-to-Indoor transition coincides with moving into a structure). As another example, if an entrance feature was identified as one-way entrance, a transition direction associated with detected entrance features is appropriate.

Signal and sensor data—A signal/sensor data-based factor may be used to facilitate matching intersection features (e.g. RF data matching including Wi-Fi scans, BLE scans, cell signal strength, GPS, magnetic anomaly matching, and the like).

In an embodiment, an entrance point feature may provide a 3-D location correction each time the entrance point feature is matched. In an embodiment, determining a merged entrance feature location may be based on a merge score weight average of altitude, position, error bounds, or a combination thereof. In an embodiment, an indication of whether an entrance feature is a one-way or two-way entrance feature may be updated.

Floors

In an embodiment, floor features may be detected when a tracked device traverses a specified distance in a structure without triggering a pressure change event and an acceleration change event within a specified time period (e.g. at the same time). In an embodiment, a pressure change event and an acceleration change event may be used to minimize the impact of various sources of pressure fluctuations that may be experienced within a structure (e.g. operation of a building's HVAC system or other environmental pressure fluctuations). In an embodiment, a floor feature may end when a pressure change event and an acceleration change event indicate an elevation change is occurring.

In an embodiment, feature descriptors associated with a floor feature may include: an elevation mean for a plurality of points inside a structure on the floor feature; a elevation variance a plurality of points inside a structure on the floor feature; an extent of the floor feature (e.g. a center point, a radius, and a bounding polygon for all points on the floor feature); signal/sensor data associated with the floor feature (e.g. compressed RF statistics, average RSSI, Wi-Fi access points, BLE nodes, and magnetic signatures); associated feature links (e.g. stair features, elevator features, entrance/exit features, and the like that are adjacent to the floor feature); elevation changes from at least one adjacent floor feature; features within the floor feature (e.g. hall features and intersection features); or a combination thereof.

Similar to entrance features, quality control filters may be used to minimize the inclusion of inaccurate floor feature detections in a global map. For example, quality control filters for floor features may be adapted to ensure that:

A number of feature points associated with a floor feature exceed a threshold value (e.g. 20 path points). For example, a floor feature has at least some number of distinct locations determined for the floor feature which may differentiate the floor feature from such features as a stairwell landing feature.

An altitude difference over the full extent of a floor feature does not exceed a threshold value (e.g. 1.3 m).

In an embodiment, a discovered floor feature may be determined to match a floor feature in the global map (e.g. building model) when an absolute altitude difference and error is below a threshold, for example 1.5 m. In an embodiment, floor features may be matched without a 2-D overlap of floor features. In this embodiment, floor features may be matched based upon each floor features corresponding altitude. In an embodiment, if a 2-D overlap of floor features is determined, signal/sensor data (e.g. RF statistics), features associated with each floor feature, or a combination thereof may be matched. In this embodiment, a merged floor feature may include: combined signal/sensor data (e.g. combined RF statistics); matched features associated with each floor feature; or a combination thereof. In an embodiment, an extent of a floor feature may be determined by an area traversed by tracked devices on the floor feature (e.g. a bounding polygon for path points) or may be based on an assumption that a floor feature footprint matches a corresponding aspect of a structure's (e.g. a building's) footprint. In an embodiment, structure footprints may be obtained from publicly available sources, such as through the OpenStreetMap project.

Mapping RF Sources

RF signal sources (e.g. BLE signal sources and others with time of flight ranging capability) ("RF anchors") are beginning to be distributed in structures for various purposes. These RF signal sources themselves may be uniquely identifiable, and thus may be mapped to provide a location correction. Described below is an exemplary method for mapping a proprietary time of flight beacon.

In an embodiment, RF anchors may provide one or more of the following information when a tracked device ranges to them: a logical ID that uniquely identifies the RF anchor; a session ID that is incremented at turn on and then fixed from turn on to turn off; a maximum horizontal distance that represents an estimate of a maximum horizontal distance that an RF anchor has moved; a maximum vertical distance that represents an estimate of the maximum vertical distance an RF anchor has moved; a range that represents an estimate of the range to an RF anchor based on time of flight measurement; or a combination thereof.

In an embodiment, a tracked device's location and position error may be sent to a server with the RF anchor information may be sent to a server, which may be merged with any other RF anchor information (e.g. RF anchor information) that has already been gathered by other tracked devices. An auto-located anchor position may be recomputed if a session ID has changed (e.g. if an RF anchor has been power cycled) or if a maximum distance moved (i.e. maximum horizontal distance or maximum vertical distance) exceeds a threshold value.

In an embodiment, RF anchor information (e.g. RF beacon data) may be filtered both for quality control and to avoid sending redundant. Because range indoors may be affected by multipath distortion, larger transmission ranges may have more error than shorter transmission ranges. In an embodiment, only transmission ranges to RF anchors (e.g. BLE beacons) with a position error plus range distance below some threshold value (e.g. 10 m for time of flight beacons) may be used to map the RF anchor.

For a still anchor, locations and error bounds may be computed based on a range and a PLI of the tracked device ranging to the RF anchor. Updates to an RF anchor location may not be made if a tracked device is not moving. While a tracked device is still, a minimum range for each RF anchor may be recorded and may be sent when the tracked device moves.

An RF anchor location may be reported by weighting a tracked device's location estimate (and a standard deviation) plus the range. In an embodiment, each time a new measurement is obtained; a location estimate and error circle may be added and weighted by radius of circle.

Corrections based on ranging to an RF anchor may affected by: the RF anchor's location; the RF anchor's error; a tracked device's location; a tracked device's error; a measured range between the RF anchor and a tracked device; or a combination thereof. For example, a correction may be a circle centered at an RF anchor's location estimate with a radius equal to the range+the error standard deviation of the RF anchor's and tracked device's location (or some multiple of it). When using ultra-wideband ranging, which may not be as effected by multipath errors, a minimum range constraint may also be used.

After obtaining range and location information from at least 10 different positions, RF anchors may begin to be used to correct location.

A similar method may work for BLE beacons and other RF sources though all information may not be available. Some indication of RF source movement may be desirable to improve map convergence when an RF source moves; however, it may not be required. For RF sources, that do not have information on whether the source has moved. If a new location is detected and submitted to a map server, the new location may affect a map location and error bound. Eventually, an RF source's location may be moved to the new location as more tracked devices observe the RF source at the new location.

Building Model

If a sufficient number of separable floors in a structure are known, a number of floors and floor spacing may be computed. If an absolute altitude of a structure is able to be derived (e.g. using knowledge of elevation of an entry location based on access to terrain data) then the structure may be located in a 3-D global map.

Detected spacings between the floors may be used to find a value that is realistic for an estimated floor-spacing. An exemplary method to do this would be to:

1. Find a minimum value that is realistic for an estimated floor-spacing among detected floors;
2. Divide all floor-spacings by this estimate to determine a single-floor estimate; and
3. Average all single-floor estimates to get a final estimate of floor spacing.

An error may be computed by comparing a difference between floor altitudes and an actual altitude based on the floor-spacing estimate. Assuming floor spacing is different for a first floor above ground level and a first floor below ground level (e.g. this may be typical in hotels), these parameters may be adjusted individually to minimize a final building error.

Figure 15:
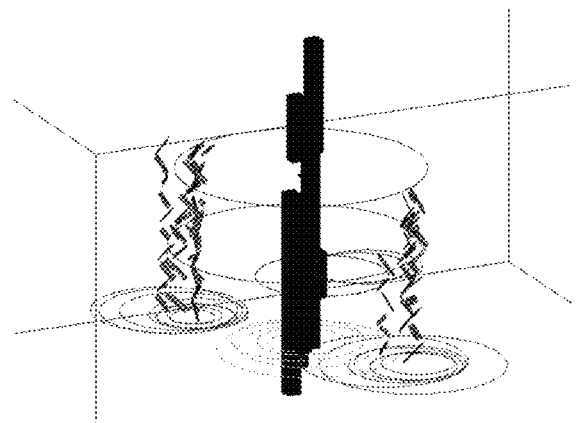
FIG. 15 is an illustration of the visualization of raw feature data and associated error data in accordance with an embodiment.
Figure 16:
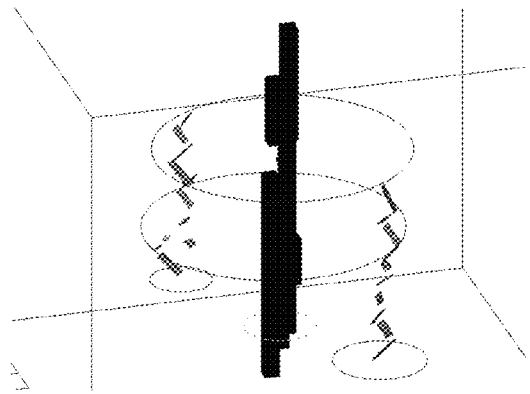
FIG. 16 is an illustration of the visualization of merged feature data and associated error data based on FIG. 15.
Figure 17:
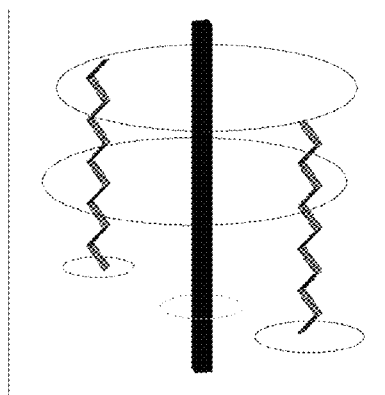
FIG. 17 is an illustration of the visualization of extracted model data and associated error data based on FIG. 16.

To better handle missing data (e.g. missed stair detections; delayed flight start detections; missing hallway features; or missing elevator segments) a feature model may be extracted based on the merged feature data. FIGS. 15-17 depict exemplary 3-D visualizations of detected and merged stairwell, elevator and floor features. FIG. 15 depicts exemplary raw feature data visualization; FIG. 16 depicts exemplary merged feature data; and FIG. 17 depicts exemplary extracted feature models.

In the example depicted, elevator feature detection is from a bank of 4 elevators. In this example, a merged feature model combines the elevator bank into one structural feature. Enhancing the feature descriptor using structural and signal/sensor information (e.g. entrance direction and magnetic signature data) may enable differentiation of elevators within an elevator bank.

Floor features may be matched to enable differentiated elevations for a global model (e.g. building model). Completed floor features may contain information including: elevation; floor number; floor entry points from elevators; floor entry points from stairwells; hallways and rooms on a floor feature; and the like. In the example depicted, only floors 4 and 6 were visited.

In FIGS. 15-17, a stair error radius is shown in darker colored circles near the bottom outside of each figure, an elevator error radius is shown in lighter colored circles near the bottom middle of each figure, and a floor extent is shown by medium colored circles above the elevator error radius (in this case indicated by a bounding circle). A merged feature center may be computed as a weighted average of the detected features. An error bound of the merged feature may be weighted towards the feature with the smallest error bound. This may enable the map to converge when feature locations with small error bounds may be determined. This may also minimize the effect of poorly located features on the map once the map has converged.

Embodiments described above provide implementations of robust features with matching for stairwells features, escalators features, elevators features, hallways features, intersections features, entrances features, and floors features. A similar approach of adding other signal and structural descriptor information to discovered features including: rooms features, key point features (e.g. stationary points like a person that may typically be stationary at their desk, a conference table, lunch room etc.), signal features such as magnetic anomalies (e.g., transitions), and localized RF (e.g., BLUETOOTH) may improve feature differentiation to enable more reliable map creation and location corrections.

The methods described may be used to create building models for both public and private spaces. There is no privacy issue in public buildings and spaces. In this case, user discovered features may be submitted and merged into the building model. Privacy issues may come into play when considering how to use data collected from private buildings. In this case, individual customers may map the buildings and hold the data so that for example, only their employees could access it. When the private space is part of a public building the map data needs to be aggregated and any conflicts resolved. One conflict resolution method would be to always use private data in a conflict.

Map Based Corrections

Additional structural and signal information in a feature descriptor may enable features to be compared and matched. As such, it may be possible to determine whether a discovered feature is in an existing map, or is a newly detected feature. A processor associated with a computer system may access and cache feature map tiles for a local area from a map server. Detected features may be compared to a known feature map to determine whether there is a match. When matches are confirmed a constraint may be provided to a navigation engine with a position and error bound. An error bound may be implemented as an approximate error radius (e.g. Gaussian 1 sigma), a Gaussian mixture (to estimate more complex multimodal distributions) or any known function describing a feature's location error.

A match confirmation may be based on a match score. If a match score is low, a correction might be made by using an expanded error. If match data can only identify the building, then a multimodal correction to all similar feature types in the building could be made.

Figure 18:
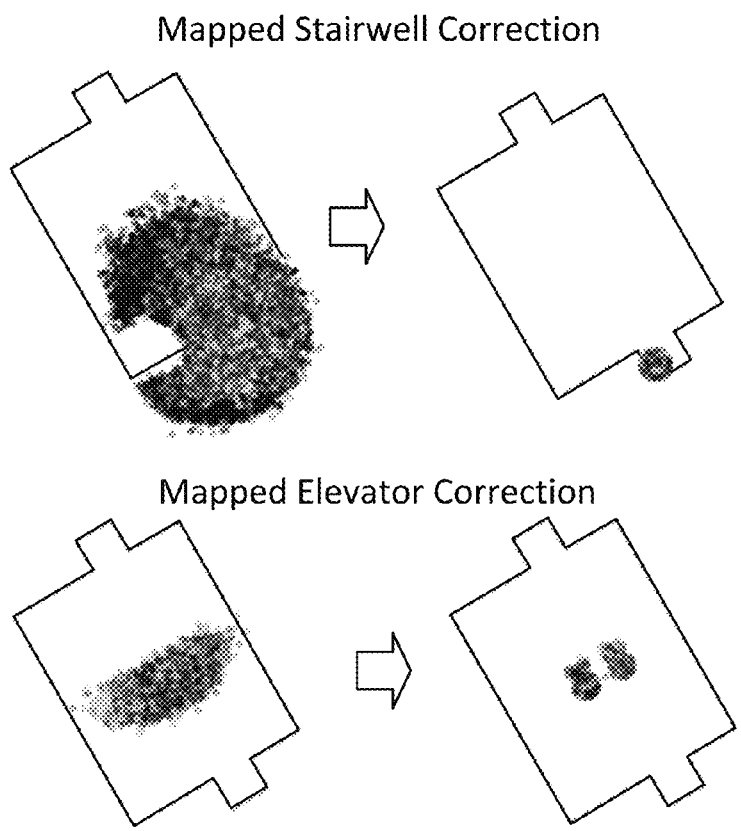
FIG. 18 is an illustration of mapped corrections for a stairwell and an elevator in accordance with an embodiment.

In an embodiment, a navigation engine may be implemented as a particle filter. In other embodiments, map based correction information may be used. In a particle filter, each "particle" in the particle filter may represent one possible tracked device model and path (e.g. location, heading, drift) and also one possible solution to an estimation problem. Constraints from map based corrections may serve to refine a solution to an estimation problem (particles not satisfying the constraint may be eliminated or de-weighted). A distribution of remaining particles may represent a probable location solution as a sampling of an underlying probability density function. FIG. 18 shows examples of elevator and stairwell corrections based on particle distributions. Medium colored particles have lower weight and darker colored particles have higher weight. The left image shows the particle distribution before the correction, and the right shows the distribution after the correction.

Map corrections may enable refinement of path parameters, such as heading, scale and drift as well as location. In order to minimize map bias (toward an existing map), a process may correct a tracked device location with a priori feature map information, which may be the feature map before the current feature has been merged into the feature map.

Power Efficiency

Power management may be an important element for processes running on mobile phones. Aside from the phone screen, wireless communication and scanning may be the second largest power draw. Accordingly, logic may be utilized to minimize the transfer of map data. References, buildings, floor plans, and known features may be sent down to the cell phone once when the cell phone is in a new location and then persisted. Discovered features may be sent up to the location assistance database upon discovery. Changes to the map may be sent down periodically using an incremental synchronization to reduce network traffic and power.

It may also be possible to minimize the amount of Wi-Fi scanning Instead of scanning at a uniform fixed rate, structural feature detection (e.g. detection of stairwell features, elevator features, hall features, entrance features, etc.) may be used as a triggering mechanism for Wi-Fi data collection. This may eliminate the need to scan when a tracked device is stationary. Storing the Wi-Fi data along with the feature may also help to uniquely identify/match the feature and improve the ability to accurately build the navigation feature maps.

Map Database

Figure 19:
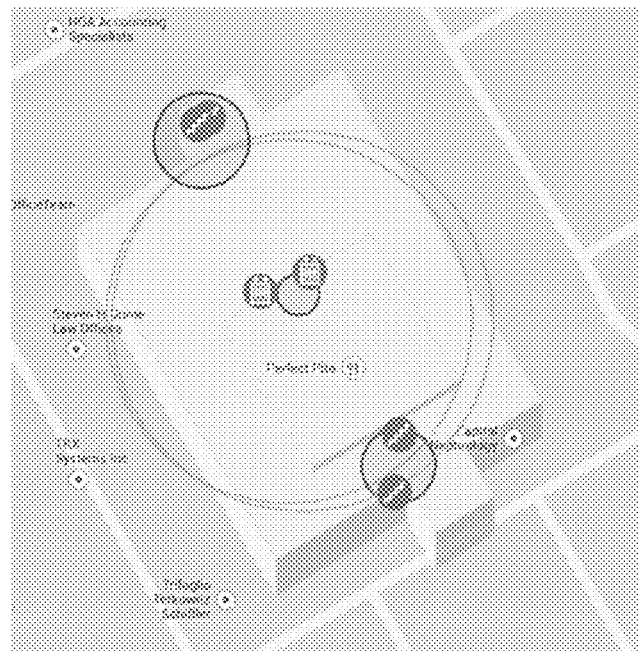
FIG. 19 is an embodiment of a visualization tool showing uncorrected feature data.
Figure 20:
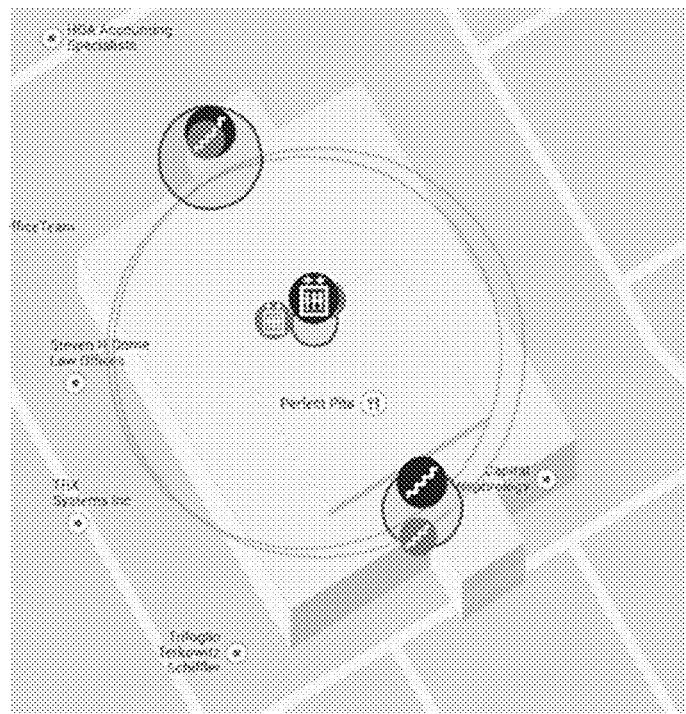
FIG. 20 is an embodiment of the tool of FIG. 19 showing uncorrected feature data and merged feature data.
Figure 21:
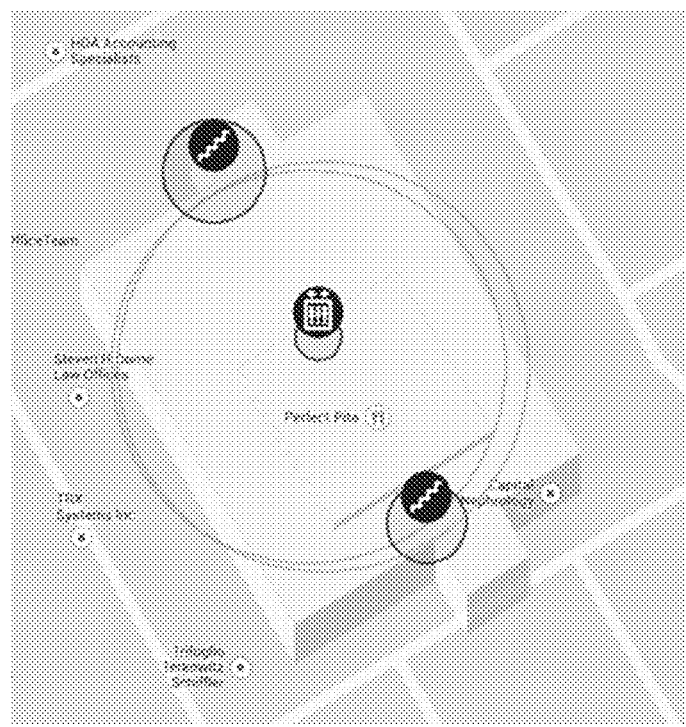
FIG. 21 in an embodiment of the tool of FIG. 20 showing merged feature data.

FIGS. 19-21 illustrate an embodiment of a web tool for visualization of detected and merged features in the server database. A location of each feature is shown by an icon, such as for a stairway or an elevator. FIGS. 19-20 show examples of detected stairwell and elevator features that have been sent to the server from tracked devices in the building. The detected features are shown in a lighter shaded icon. FIGS. 20-21 show merged stairwell and elevator features as a darker shaded icon. The merged feature center of FIG. 21 is computed as a weighted average of the detected features. The error bound, shown by smaller circles, of the merged feature, is weighted towards the feature with the smallest error bound. This may allow the map to converge when feature locations with small error bounds are determined and may also minimize the effect of poor location on feature location once the map has converged. The larger circles in FIGS. 19-21 show a 2-D representation of two detected floor features.

Figure 22:
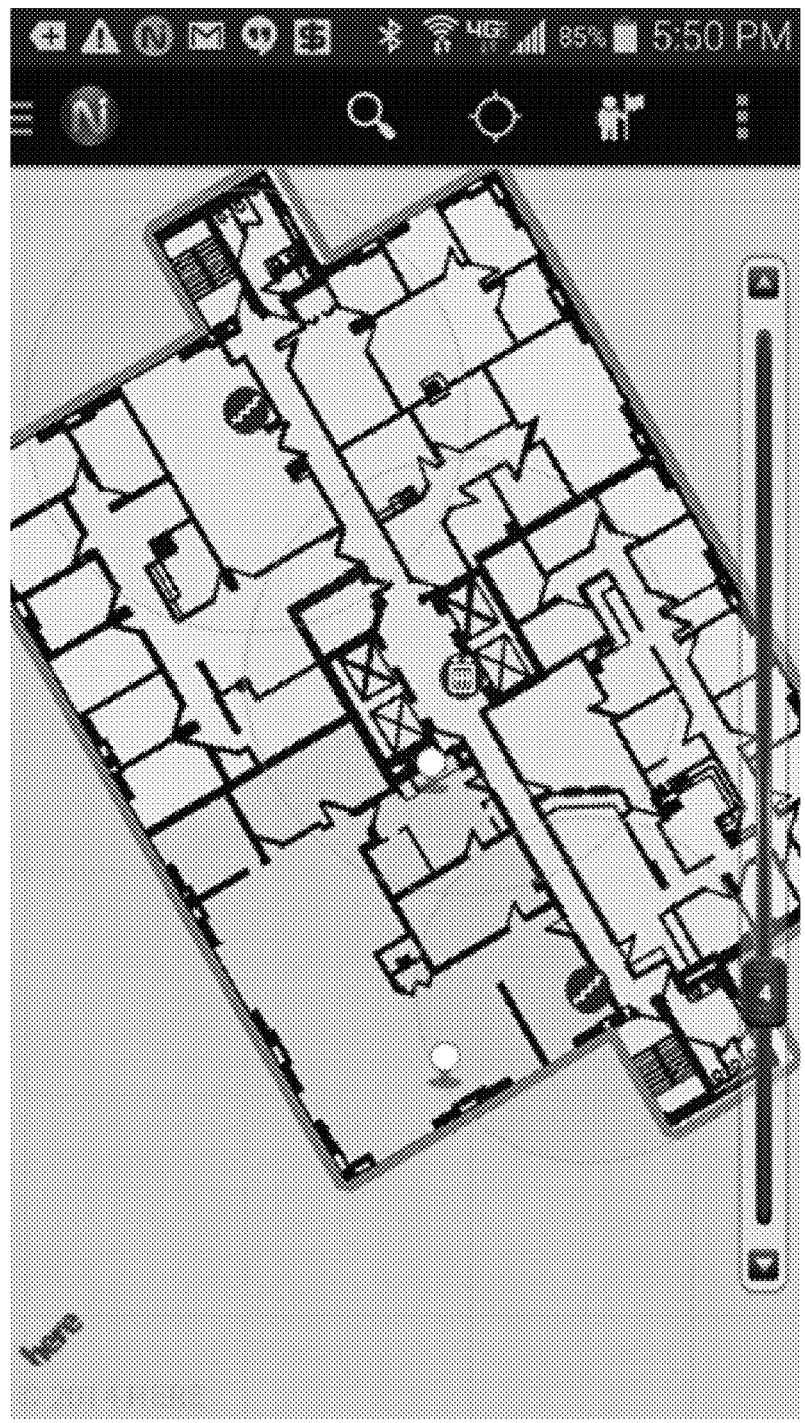
FIG. 22 is an embodiment of a location and mapping tool on a handheld device based on FIG. 21.

In an embodiment, a Mapper Mode may be enabled (or disabled) from a settings menu. In a Mapper Mode, users may be notified that they should provide a location correction when their error bound is large (to enable improved feature locations and faster map convergence). The merged structural features may also be displayed on in an exemplary interface of a mobile device, such as shown in FIG. 22, when operating in a Mapper Mode and connected to a server. Location services may use the merged features for correction. The map corrections enable refinement of path parameters such as heading, scale and drift as well as location.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 23:
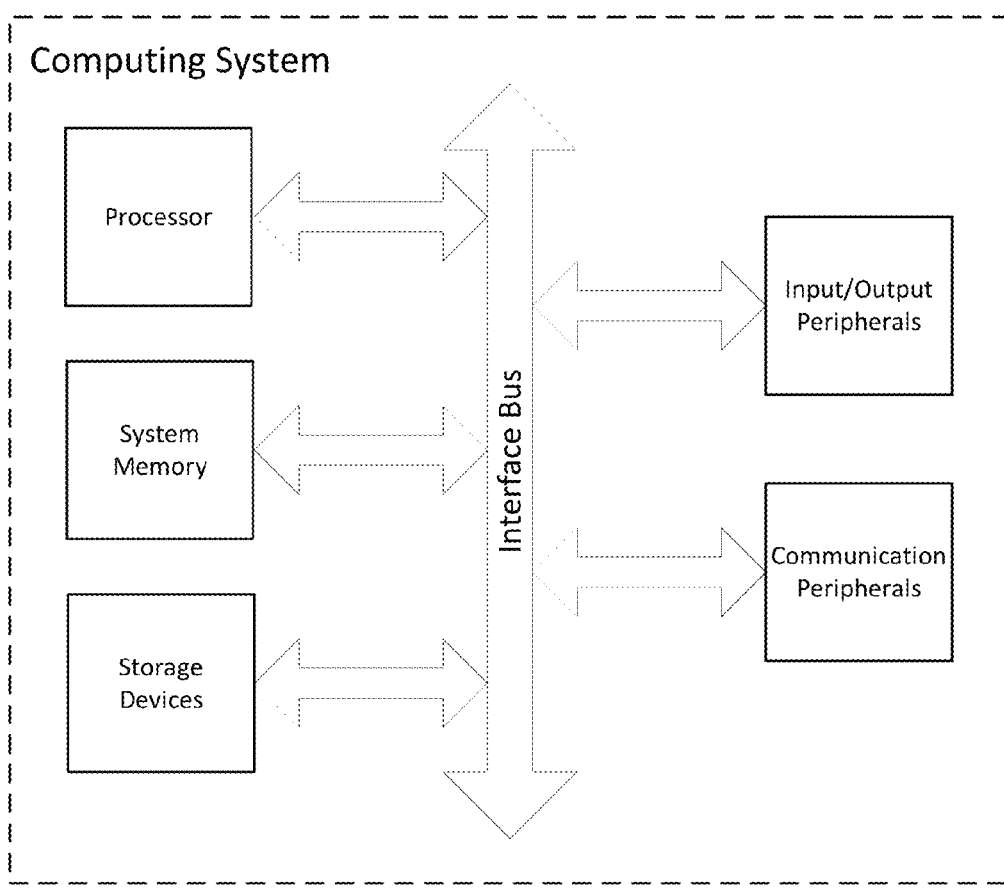
FIG. 23 is an illustration of an exemplary block diagram representing a general purpose computer system in which aspects of the methods and systems disclosed herein or portions thereof may be incorporated.

The techniques described above can be implemented on a computing device associated with a user (e.g., gyroscope and accelerometer sensors implemented on a device worn or carried by the user), a plurality of computing devices associated with a plurality of users, a server in communication with the computing device(s) (e.g., a server configured to calibrate the gyroscope and accelerometer sensors of the device worn or carried by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. FIG. 23 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the indoor/outdoor detector or indoor/outdoor manager and the navigation engine as described above. The computing system components may be present in the device worn or carried by the user, in a server or other component of a network, or distributed between some combination of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

Figure 24:
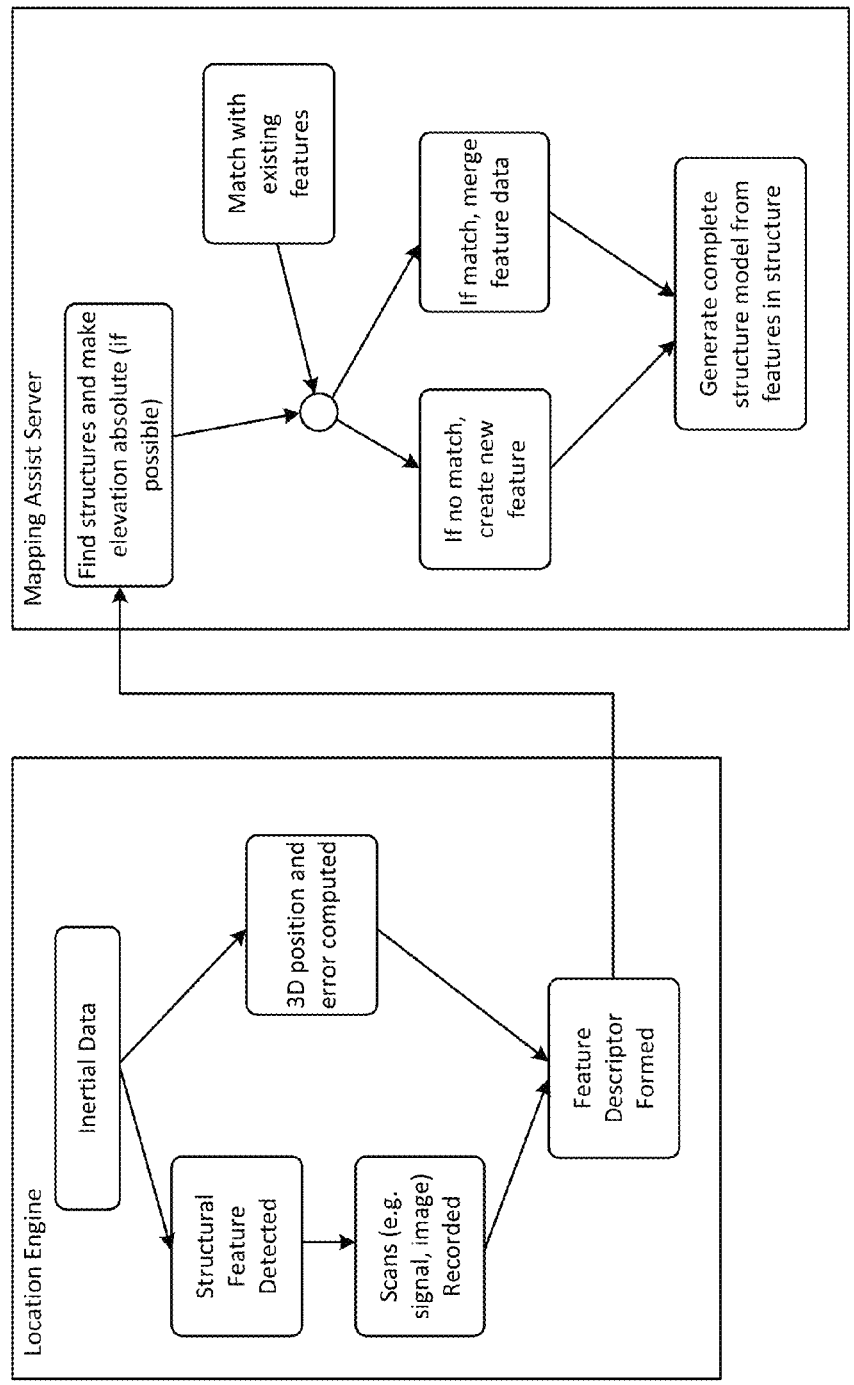
FIG. 24 is a diagram of a location system in accordance with an embodiment.

FIG. 24 illustrates an exemplary computing system architecture for creating crowdsourced structural models according to an embodiment of the present disclosure. As shown in FIG. 24, a location engine associated with a tracked device may be configured to perform such functions described above as: detecting structural features based, in part, on inertial data obtained from the tracked device; determining 3-D positions and/or error data associated with detected structural features; scanning for other signal or sensor data associated with a detected structural feature; providing one or more feature descriptors associated with detected structural features; or a combination thereof. A mapping assistant server may be configured to perform such functions described above as: identify a structural model using detected structural features received from location engines and/or other data associated with location engines; determine if newly detected structural features received from location engines match existing structural features in a structural model; merging newly detected structural features received from location engines with existing structural features in a structural model if a match exists; adding newly detected structural features received from location engines to a structural model if no match exists; generate a structural model using detected structural features associated with a structure; or a combination thereof.

As previously noted, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A computer-implemented method for localizing a mobile device at a structure and generating or updating maps representing the structure, the method comprising:
   detect a structural feature associated with the structure using sensor data associated with the mobile device while traversing the detected structural feature;
   upon detecting the structural feature, obtain signal data associated with the detected structural feature's environment;
   generate a mobile structure map representing the structure at the mobile device using the sensor data;
   communicate a feature descriptor to a server communicatively coupled to a dataset comprised of previously received feature descriptors and one or more mobile structure maps generated using the previously received feature descriptors, each feature descriptor associated with a corresponding structural feature and including sensor data used by other mobile devices to detect the corresponding structural feature, signal data obtained by the other mobile devices upon detecting the corresponding structural feature, or a combination thereof; and in response to the communicated feature descriptor, receive a map correction from the server that corrects the detected structural feature's location on the mobile structure map.

2. The computer-implemented method of claim 1, wherein the sensor data describes physical information about the detected structural feature and includes inertial sensor data, pressure sensor data, location data, or a combination thereof.

3. The computer-implemented method of claim 1, wherein the obtained signal data provides differentiating information to further distinguish the corresponding structural feature and includes radio frequency signal data, magnetic field data, vibration data, acoustic signature data, image data, light data, or a combination thereof.

4. The computer-implemented method of claim 1, wherein the detected structural features serves as a trigger for the mobile device to scan for signal data associated with the detected structural feature's environment.

5. The computer-implemented method of claim 1, wherein the mobile device continually scans for signal data associated with the detected structural feature's environment, wherein the method further comprises:
generate a timestamp upon detecting structural features that serves as a reference point for the mobile device to aggregate obtained signal data in predefined time windows around the reference point.

6. The computer-implemented method of claim 1, wherein the method further comprises:
upon receiving the map correction, refine one or more path parameters describing a path followed by the mobile device, the one or more path parameters including heading, scale, drift, mobile device location, or a combination thereof.

7. A computing system for localizing a mobile device traversing a structure and generate or update maps representing the structure, the computing system comprising:
one or more processors; and
a memory communicatively coupled to the processor, the memory bearing instructions that, when executed on the one or more processors, cause the computing system to at least:
receive a feature descriptor comprised of sensor data used by the mobile device to detect a structural feature while traversing the detected structural feature;
determine whether a match exists between the detected structural feature and existing structural features described by previously received feature descriptors aggregated in a dataset using match scores, each match score comprised of similarity scores generated for one or more match score factors based on data from the feature descriptor and data associated with a particular existing structural feature compiled from the previously received feature descriptors;
upon determining the match exists, communicate a map correction that corrects the detected structural feature's location on a mobile structure map generated by the mobile device using the sensor data.

8. The computing system of claim 7, wherein the one or more match score factors include a location-based factor that matches the detected structural feature and the particular existing structural feature based on similarities in corresponding locations and error bound information, the location-based factor's similarity score computed using: horizontal error bound overlap; elevation error bound overlap; feature density within the horizontal error bound; feature density within the elevation error bound; or a combination thereof.

9. The computing system of claim 7, wherein the one or more match score factors include a structure-based factor that matches the detected structural feature and the particular existing structural feature based on similarities in structural characteristics, the structure-based factor's similarity score computed based upon matches between one or more corresponding structural characteristics of the detected structural feature and the particular existing structural feature.

10. The computing system of claim 7, wherein the one or more match score factors include a signal-based factor that matches the detected structural feature and the particular existing structural feature based on similarities in signal data associated with corresponding environments, the signal-based factor's similarity score computed based upon one or more matches in signal data associated with the environment corresponding to the detected structural feature and the particular existing structural feature.

11. The computing system of claim 7, wherein the sensor data describes physical information about the detected structural feature and includes inertial sensor data, pressure sensor data, location data, or a combination thereof.

12. The computing system of claim 7, wherein feature descriptors further include signal data associated with a corresponding structural feature's environment that provides differentiating information to further distinguish the corresponding structural feature, the signal data including radio frequency signal data, magnetic field data, vibration data, acoustic signature data, image data, light data, or a combination thereof.

13. The computing system of claim 7, wherein the feature descriptor message is a parent message describing the detected structural feature as a whole.

14. The computing system of claim 7, wherein the feature descriptor message is a child message describing a sub-portion of the detected structural feature.

15. The computing system of claim 7, wherein the instructions further cause the computing system to filter feature descriptors using one or more quality control filters prior to determining matches to exclude feature descriptors that fail to satisfy one or more quality standards from being included in the dataset.

16. The computing system of claim 7, wherein the instructions further cause the computing system to merge the detected structural feature with the particular existing feature by merging data in the feature descriptor with data from previously received feature descriptors describing the particularly existing structural feature.

17. The computing system of claim 7, wherein the instructions further cause the computing system to add the detected structural feature to a structural map generated using the previously received feature descriptors aggregated in the dataset.

18. A non-transitory computer-readable storage medium comprising instructions tangibly embodied thereon that, when executed by a computing device adapted to localize a mobile device traversing a structure and generate or update maps representing the structure, cause the computing device to at least:
receive a feature descriptor comprised of sensor data used by the mobile device to detect a structural feature while traversing the detected structural feature and signal data associated with the detected structural feature's environment that provides differentiating information to further distinguish the detected structural feature from other structural features;
identify the structure associated with the detected structural feature using the received feature descriptor;

determine whether a match exists between the detected structural feature and a structural feature existing in a structure map generated using previously received feature descriptors aggregated in a dataset, the match determined based on a match scores comprised of similarity scores generated for one or more match score factors based on data from the feature descriptor and data associated with the existing structural feature compiled from the previously received feature descriptors; and upon determining the match exists, communicate a map correction that corrects the detected structural feature's location on a mobile structure map generated by the mobile device using the sensor data.

19. The non-transitory computer-readable storage medium of claim 18, wherein the signal data includes radio frequency ("RF") signal data; magnetic field data; vibration data; acoustic signature data; image data; light data; or a combination thereof, the RF signal data including signal strength; signal statistics; signal identifiers; signal source identifiers; signal source direction; or a combination thereof.

20. The non-transitory computer-readable storage medium of claim 18, wherein the instructions further cause the computing device to identify the detected structural feature, the structure associated with the detected structural feature, or a combination thereof using the signal data.

* * * * *